(12) United States Patent
Kuhn et al.

(10) Patent No.: US 10,387,873 B2
(45) Date of Patent: *Aug. 20, 2019

(54) SYSTEMS, METHODS, AND COMPUTER PROGRAM PRODUCTS FOR INTEGRATING THIRD PARTY SERVICES WITH A MOBILE WALLET

(71) Applicant: GOOGLE LLC, Mountain View, CA (US)

(72) Inventors: Stephen Kuhn, Tarrytown, NY (US); Daniel L. Lipton, New York, NY (US); Kai P. Johnson, San Diego, CA (US); Ryan Watkins, Brooklyn, NY (US)

(73) Assignee: GOOGLE LLC, Mountain View, CA (US)

( * ) Notice: Subject to any disclaimer, the term of this patent is extended or adjusted under 35 U.S.C. 154(b) by 392 days.

This patent is subject to a terminal disclaimer.

(21) Appl. No.: 15/404,439

(22) Filed: Jan. 12, 2017

(65) Prior Publication Data

US 2017/0124559 A1    May 4, 2017

Related U.S. Application Data

(63) Continuation of application No. 13/934,014, filed on Jul. 2, 2013, now Pat. No. 9,563,891.
(Continued)

(51) Int. Cl.
*G06Q 40/00* (2012.01)
*G06Q 20/38* (2012.01)
(Continued)

(52) U.S. Cl.
CPC ......... *G06Q 20/3829* (2013.01); *G06Q 20/02* (2013.01); *G06Q 20/32* (2013.01);
(Continued)

(58) Field of Classification Search
CPC ........ G06Q 20/02; G06Q 20/32; G06Q 20/36; G06Q 20/367; G06Q 20/3674; G06Q 20/3829; G06Q 20/40; G06Q 40/00
(Continued)

(56) References Cited

U.S. PATENT DOCUMENTS 5,590,038 A    12/1996  Pitroda
5,640,002 A     6/1997  Ruppert et al.
(Continued)

FOREIGN PATENT DOCUMENTS

CA    2381614 A1    3/2001
EP    1 222 503 A2   7/2002
(Continued)

OTHER PUBLICATIONS

Grant, E. X. (2001). Web wallets make shopping simple—love online shopping, but hate the endless data entry? try a digital wallet. Computer Shopper, , 134. Retrieved from https://dialog.proquest.com/professional/docview/675538886?accountid=142257 on Mar. 12, 2019 (Year: 2001).*
(Continued)

*Primary Examiner* — Kito R Robinson
(74) *Attorney, Agent, or Firm* — Johnson, Marcou & Isaacs, LLC

(57) ABSTRACT

Systems, methods, and computer program products are provided for providing a third party service via a wallet client. Service provider information is received from a service provider and stored in a wallet client database. Based on the service provider information, a wallet client is authenticated with a service provider system, a communication session is established, and a servicing environment is invoked.

21 Claims, 14 Drawing Sheets

Related U.S. Application Data

(60) Provisional application No. 61/669,576, filed on Jul. 9, 2012, provisional application No. 61/669,915, filed on Jul. 10, 2012, provisional application No. 61/816,488, filed on Apr. 26, 2013.

(51) Int. Cl.
*G06Q 20/36* (2012.01)
*G06Q 20/02* (2012.01)
*G06Q 20/32* (2012.01)
*H04W 4/60* (2018.01)
*H04L 29/08* (2006.01)
*G06Q 20/40* (2012.01)

(52) U.S. Cl.
CPC ........... *G06Q 20/36* (2013.01); *G06Q 20/367* (2013.01); *G06Q 20/3674* (2013.01); *H04L 67/141* (2013.01); *H04W 4/60* (2018.02); *G06Q 20/40* (2013.01); *G06Q 40/00* (2013.01); *G06Q 2220/00* (2013.01)

(58) Field of Classification Search
USPC ........................................................ 705/41
See application file for complete search history.

(56) References Cited

U.S. PATENT DOCUMENTS

| | | | |
|---|---|---|---|
| 5,715,314 A * | 2/1998 | Payne | G06Q 10/087 705/26.35 |
| 5,748,740 A | 5/1998 | Curry et al. | |
| 5,805,702 A | 9/1998 | Curry et al. | |
| 5,884,271 A | 3/1999 | Pitroda | |
| 5,901,303 A | 5/1999 | Chew | |
| 5,940,510 A | 8/1999 | Curry et al. | |
| 5,949,880 A | 9/1999 | Curry et al. | |
| 6,073,840 A | 6/2000 | Marion | |
| 6,105,013 A | 8/2000 | Curry et al. | |
| 6,116,505 A | 9/2000 | Withrow | |
| 6,131,811 A | 10/2000 | Gangi | |
| 6,237,095 B1 | 5/2001 | Curry et al. | |
| 6,422,464 B1 | 7/2002 | Terranova | |
| 6,587,835 B1 | 7/2003 | Treyz et al. | |
| 6,601,759 B2 | 8/2003 | Fife et al. | |
| 6,671,358 B1 | 12/2003 | Seidman et al. | |
| 6,732,081 B2 | 5/2004 | Nicholson | |
| 6,735,694 B1 * | 5/2004 | Berstis | H04L 63/0823 713/176 |
| 6,769,607 B1 | 8/2004 | Pitroda et al. | |
| 6,813,609 B2 | 11/2004 | Wilson | |
| 6,837,436 B2 | 1/2005 | Swartz et al. | |
| 6,925,439 B1 | 8/2005 | Pitroda | |
| 7,083,094 B2 | 8/2006 | Cooper | |
| 7,110,792 B2 | 9/2006 | Rosenberg | |
| 7,127,236 B2 | 10/2006 | Khan et al. | |
| 7,155,405 B2 | 12/2006 | Petrovich | |
| 7,194,422 B1 | 3/2007 | St. John Killick | |
| 7,216,109 B1 | 5/2007 | Donner | |
| 7,249,112 B2 | 7/2007 | Berardi et al. | |
| 7,286,818 B2 | 10/2007 | Rosenberg | |
| 7,298,271 B2 | 11/2007 | Sprogis | |
| 7,308,426 B1 | 12/2007 | Pitroda | |
| 7,330,714 B2 | 2/2008 | Rosenberg | |
| 7,349,885 B2 | 3/2008 | Gangi | |
| 7,469,151 B2 | 12/2008 | Khan et al. | |
| 7,469,381 B2 | 12/2008 | Ording | |
| 7,483,858 B2 | 1/2009 | Foran et al. | |
| 7,494,055 B2 | 2/2009 | Fernandes et al. | |
| 7,529,563 B1 | 5/2009 | Pitroda | |
| 7,571,139 B1 | 8/2009 | Giordano et al. | |
| 7,581,678 B2 | 9/2009 | Narendra et al. | |
| 7,613,628 B2 | 11/2009 | Ariff et al. | |
| 7,631,810 B2 | 12/2009 | Liu et al. | |
| 7,693,752 B2 | 4/2010 | Jaramillo | |
| 7,708,198 B2 | 5/2010 | Gangi | |
| 7,712,658 B2 | 5/2010 | Gangi | |
| 7,775,430 B2 | 8/2010 | Lin | |
| 7,805,615 B2 | 9/2010 | Narendra et al. | |
| 7,828,214 B2 | 11/2010 | Narendra et al. | |
| 7,856,377 B2 | 12/2010 | Cohagan et al. | |
| 7,864,163 B2 | 1/2011 | Ording et al. | |
| 7,942,337 B2 | 5/2011 | Jain | |
| 7,954,715 B2 | 6/2011 | Narendra et al. | |
| 7,954,716 B2 | 6/2011 | Narendra et al. | |
| 7,954,717 B2 | 6/2011 | Narendra et al. | |
| 7,961,101 B2 | 6/2011 | Narendra et al. | |
| 7,967,215 B2 | 6/2011 | Kumar et al. | |
| 7,991,158 B2 | 8/2011 | Narendra et al. | |
| 8,060,916 B2 * | 11/2011 | Bajaj | H04L 9/3213 713/168 |
| 8,072,331 B2 | 12/2011 | Narendra et al. | |
| 8,083,145 B2 | 12/2011 | Narendra et al. | |
| 8,091,786 B2 | 1/2012 | Narendra et al. | |
| 8,112,354 B2 * | 2/2012 | Lalwani | G06Q 20/102 705/40 |
| 8,131,645 B2 | 3/2012 | Lin et al. | |
| 8,140,418 B1 | 3/2012 | Casey et al. | |
| 8,396,808 B2 | 3/2012 | Greenspan | |
| 8,429,046 B2 | 4/2013 | Pitroda | |
| 8,584,224 B1 * | 11/2013 | Pei | H04L 9/3213 713/168 |
| 9,419,973 B2 * | 8/2016 | Oyman | H04L 63/126 |
| 9,563,891 B2 * | 2/2017 | Kuhn | G06Q 20/36 |
| 2002/0049631 A1 | 4/2002 | Williams | |
| 2002/0065774 A1 | 5/2002 | Young et al. | |
| 2002/0082921 A1 | 6/2002 | Rankin | |
| 2002/0107755 A1 | 8/2002 | Steed et al. | |
| 2002/0111919 A1 * | 8/2002 | Weller | G06Q 20/02 705/67 |
| 2002/0174025 A1 | 11/2002 | Hind et al. | |
| 2002/0179703 A1 | 12/2002 | Allen | |
| 2003/0009382 A1 | 1/2003 | D'Arbeloff et al. | |
| 2003/0083042 A1 | 5/2003 | Abuhamdeh | |
| 2003/0115126 A1 | 6/2003 | Pitroda | |
| 2003/0132298 A1 | 7/2003 | Swartz et al. | |
| 2003/0196087 A1 * | 10/2003 | Stringer | G06F 21/6209 713/171 |
| 2003/0200489 A1 | 10/2003 | Hars | |
| 2003/0229792 A1 * | 12/2003 | Baldwin | G06F 21/33 713/185 |
| 2003/0236977 A1 * | 12/2003 | Levas | G06F 21/33 713/158 |
| 2004/0073519 A1 | 4/2004 | Fast | |
| 2004/0186768 A1 | 9/2004 | Wakim et al. | |
| 2004/0225881 A1 * | 11/2004 | Walmsley | B41J 2/04505 713/161 |
| 2005/0004866 A1 | 1/2005 | Bonalle et al. | |
| 2005/0171898 A1 | 8/2005 | Bishop et al. | |
| 2005/0187873 A1 | 8/2005 | Labrou et al. | |
| 2005/0222961 A1 | 10/2005 | Staib et al. | |
| 2005/0234769 A1 | 10/2005 | Jain et al. | |
| 2005/0247777 A1 | 11/2005 | Pitroda | |
| 2006/0240802 A1 * | 10/2006 | Venkitaraman | H04L 63/067 455/411 |
| 2006/0274695 A1 * | 12/2006 | Krishnamurthi | H04L 63/0807 370/331 |
| 2006/0287004 A1 | 12/2006 | Fuqua | |
| 2007/0014407 A1 | 1/2007 | Narendra et al. | |
| 2007/0014408 A1 | 1/2007 | Narendra et al. | |
| 2007/0125838 A1 * | 6/2007 | Law | G06Q 20/04 235/379 |
| 2007/0198432 A1 | 8/2007 | Pitroda et al. | |
| 2008/0010193 A1 | 1/2008 | Rackley, III et al. | |
| 2008/0109657 A1 * | 5/2008 | Bajaj | H04L 9/3213 713/168 |
| 2008/0189186 A1 | 8/2008 | Choi et al. | |
| 2008/0306849 A1 | 12/2008 | Johnson et al. | |
| 2009/0106550 A1 * | 4/2009 | Mohamed | H04L 63/045 713/156 |
| 2009/0108064 A1 | 4/2009 | Fernandes et al. | |
| 2009/0132392 A1 | 5/2009 | Davis et al. | |
| 2009/0164322 A1 | 6/2009 | Khan et al. | |

(56) References Cited

U.S. PATENT DOCUMENTS

| | | | |
|---|---|---|---|
| 2009/0265556 A1* | 10/2009 | Lee | G06F 21/10 |
| | | | 713/169 |
| 2010/0241494 A1 | 9/2010 | Kumar et al. | |
| 2010/0325006 A1 | 12/2010 | White | |
| 2011/0073663 A1 | 3/2011 | Narendra et al. | |
| 2011/0171996 A1 | 7/2011 | Narendra et al. | |
| 2011/0223972 A1 | 9/2011 | Narendra et al. | |
| 2011/0231238 A1 | 9/2011 | Khan et al. | |
| 2011/0244796 A1 | 10/2011 | Khan et al. | |
| 2011/0269438 A1 | 11/2011 | Narendra et al. | |
| 2011/0270748 A1 | 11/2011 | Graham et al. | |
| 2011/0271044 A1 | 11/2011 | Narendra et al. | |
| 2011/0272468 A1 | 11/2011 | Narendra et al. | |
| 2011/0272469 A1 | 11/2011 | Narendra et al. | |
| 2012/0064828 A1 | 3/2012 | Khan et al. | |
| 2012/0095852 A1 | 4/2012 | Bauer et al. | |
| 2012/0109764 A1 | 5/2012 | Martin et al. | |
| 2012/0323664 A1 | 12/2012 | Klems | |
| 2013/0191227 A1* | 7/2013 | Pasa | G06Q 20/3674 |
| | | | 705/14.73 |
| 2013/0268437 A1* | 10/2013 | Desai | G06Q 20/08 |
| | | | 705/41 |
| 2013/0311382 A1* | 11/2013 | Fosmark | G06Q 20/02 |
| | | | 705/71 |
| 2013/0346302 A1* | 12/2013 | Purves | G06Q 20/102 |
| | | | 705/40 |
| 2014/0012750 A1 | 1/2014 | Kuhn et al. | |
| 2014/0012751 A1 | 1/2014 | Kuhn et al. | |
| 2015/0121484 A1* | 4/2015 | Liu | G06F 16/9566 |
| | | | 726/5 |
| 2015/0350205 A1* | 12/2015 | Oyman | H04L 63/126 |
| | | | 726/7 |

FOREIGN PATENT DOCUMENTS

| | | |
|---|---|---|
| EP | 0 766 852 B1 | 8/2004 |
| EP | 1 412 890 A4 | 11/2004 |
| EP | 1 477 943 A2 | 11/2004 |
| KR | 10-2005-0036512 A | 4/2005 |
| WO | 2001/018629 A3 | 5/2001 |
| WO | 2003/012717 A1 | 2/2003 |
| WO | 2012/091349 A2 | 7/2012 |
| WO | 2014/011453 A2 | 1/2014 |
| WO | 2014/011454 A2 | 1/2014 |
| WO | 2014/011453 A3 | 4/2014 |
| WO | 2014/011454 A3 | 4/2014 |

OTHER PUBLICATIONS

Radcliff, D. (2006). Online banks strengthen security; financial firms tap multifactor authentication to give customers an added level of protection. Network World, , 59. Retrieved from https://dialog.proquest.com/professional/docview/670054071?accountid=142257 on Mar. 12, 2019 (Year: 2006).*

Agnes, "International Preliminary Report on Patentability issued in International Application No. PCT/US2013/049137", dated Jan. 22, 2015, 7 pages.

Athina, "International Preliminary Report on Patentability issued in International Application No. PCT/US2013/049139", dated Jan. 22, 2015, 7 pages.

Nguyen, "U.S. Office Action issued in copending U.S. Appl. No. 13/934,008, filed Jul. 2, 2013", dated Dec. 18, 2013, 21 pages.

Nguyen, "U.S. Office Action issued in copending U.S. Appl. No. 13/934,008, filed Jul. 2, 2013", dated Apr. 23, 2015, 24 pages.

Nguyen, "U.S. Office Action issued in copending U.S. Appl. No. 13/934,008, filed Jul. 2, 2013", dated May 14, 2014, 24 pages.

Nguyen, "U.S. Office Action issued in copending U.S. Appl. No. 13/934,008, filed Jul. 2, 2013", dated Aug. 13, 2015, 25 pages.

Nguyen, "U.S. Office Action issued in copending U.S. Appl. No. 13/934,008, filed Jul. 2, 2013", dated Dec. 17, 2014, 26 pages.

Oh, "International Search Report and Written Opinion issued in International Application No. PCT/US2013/049137", dated Feb. 25, 2014, 8 pages.

Oh, "International Search Report and Written Opinion issued in International Application No. PCT/US2013/049139", dated Feb. 25, 2014, 8 pages.

Proquest, "Diversinet debuts commercially deployed platform for secure mobile phone access to sensitive information", mailed on Jun. 17, 2008, 2 pages.

Robinson, "U.S. Office Action issued in copending U.S. Appl. No. 13/934,014, filed Jul. 2, 2013", dated Jan. 26, 2015, 13 pages.

Robinson, "U.S. Office Action issued in copending U.S. Appl. No. 13/934,014, filed Jul. 2, 2013", dated Jul. 27, 2015, 8 pages.

* cited by examiner

SYSTEMS, METHODS, AND COMPUTER PROGRAM PRODUCTS FOR INTEGRATING THIRD PARTY SERVICES WITH A MOBILE WALLET

CROSS-REFERENCE TO RELATED APPLICATIONS

The present application is a continuation of and claims priority to U.S. Non-Provisional patent application Ser. No. 13/934,014, filed Jul. 2, 2013, and entitled "Systems, Methods, and Computer Program Products for Integrating Third Party Services with a Mobile Wallet," which claims priority to U.S. Provisional Application Nos. 61/669,576, filed on Jul. 9, 2012, and entitled "Integration Of Mobile Wallet With Issuer Or Third Party Services For Integrated User Experience," 61/669,915, filed on Jul. 10, 2012, and entitled "Integration Of Mobile Wallet With Issuer Or Third Party Services For Integrated User Experience," and 61/816,488, filed on Apr. 26, 2013, and entitled "Systems, Methods, And Computer Program Products For Managing Issuer Data." The entire contents of the above-identified priority applications are hereby fully incorporated herein by reference.

BACKGROUND

Field

Example aspects described herein relate generally to mobile wallets in mobile devices for use in mobile commerce, and more particularly to systems, methods, and computer program products for integrating a mobile wallet with third party services.

Related Art

Mobile devices are becoming more and more versatile, and are being used in an increasing number of ways to make various everyday tasks simpler and/or more efficient. One area where mobile devices are being used is the mobile commerce environment. For example, mobile devices are being augmented to include mobile wallets that can be used to conduct financial (e.g., payments) and/or non-financial (e.g., venue admissions) transactions, without the need for physical cash, checks, credit cards, tickets, and/or the like.

Some mobile wallets include payment products, in some cases provided by different service providers, that a consumer (also referred to herein as a "user") can use to conduct financial transactions using a corresponding one or more accounts held by the consumer at the service providers. A service provider (SP) is a company (e.g., a credit card account issuer), organization, entity, and/or the like that provides one or more services to customers or consumers. Service providers often interact with consumers, for example, to provide information regarding their accounts, their payment product, loyalty offers, and/or the like. Service providers have several means by which to communicate with consumers of their services. For example, service providers may communicate with consumers via postal mail, email, telephone, and/or the like. However, these means are not always the most efficient way to communicate with consumers. For example, postal mail can be slow, and consumers may seldom check their email, or may be difficult to reach by telephone.

Mobile wallets provide an additional means for service providers to provide communicate with, and provide services to, their consumers. Providing services via a mobile wallet, however, can carry increased security risks, for example, by exposing sensitive information to possible exploitation by hackers. In addition, consumers may hold numerous accounts at numerous service providers, each of which uses one or more different means of communicating with the consumer. This can make for a fragmented and inconsistent user experience.

Given the foregoing, it would be beneficial to enable consumers to utilize multiple services provided by multiple service providers via mobile wallets in a secure, efficient, integrated, and consistent manner. It would also be beneficial to enable the multiple service providers to provide notifications and/or other communications to consumers via the mobile wallets in a targeted, efficient, integrated, and consistent manner.

SUMMARY

The example embodiments herein provide systems, methods, and computer program products for integrating a mobile wallet with third party services.

In accordance with one example aspect herein, service provider information is received from a service provider and stored in a wallet client database. Based on the service provider information, a wallet client is authenticated with a service provider system, a communication session is established, and a servicing environment is invoked.

In some example embodiments herein, the service provider information may include any one or a combination of: a service provider name, a service provider listing, a payment product name, customer care contact information, a uniform resource locator (URL) to a payment product registration webpage, a URL to a payment product activation service, a URL to a service provider website, a URL to a service provider mobile application, a logo corresponding to payment product, payment product identifying digits, a payment product expiration date, a payment product current balance, a payment product amount of available credit, and an activation state of the payment product.

In one example herein, database entries (e.g., including, in association with a service provider and an operating system, a base URL, an authentication procedure, and a URL signature) are stored in the wallet client database. The authenticating of the wallet client includes: validating the URL signature, creating an authentication request based on the base URL, adding parameters to the authentication request based on the authentication procedure, thereby generating an augmented authentication request, and transmitting the augmented authentication request to the service provider system.

In accordance with some example aspects herein, the establishing of the communication session includes: generating a first nonce and a second nonce; transmitting a session establishment request to a wallet server, the session establishment request including any one or a combination of: the first nonce and the second nonce, a cryptographic ticket scheme, a wallet identifier associated with the wallet client, and a mobile device identifier associated with the wallet client; generating a signing key based on the first nonce; generating an encryption key based on the second nonce signing at least one message using the signing key; and encrypting the at least one message using the encryption key.

In another example herein, the invoking of the servicing environment includes: retrieving a URL from the service provider information in the wallet client database; signing the URL using the signing key and encrypting the URL using the encryption key, thereby generating a signed encrypted URL; and transmitting, to the service provider system, an invocation message including a wallet identifier and the signed encrypted URL. The URL, in one example, may correspond to any one or a combination of a service provider website, a service provider web application, a service provider mobile device application, or a mobile device application store application. In another example aspect herein, if the URL corresponds to a service provider mobile device application that is unavailable, then the wallet client launches a mobile device application store application and downloads the service provider mobile device application.

In another example embodiment, after the invoking of the service environment, a payment product is added to the wallet client, a payment product is activated, payment product details are presented, a payment product is upgraded, and/or funds are added to a payment product.

BRIEF DESCRIPTION OF THE DRAWINGS

The features and advantages of the example embodiments presented herein will become more apparent from the detailed description set forth below when taken in conjunction with the following drawings.

DETAILED DESCRIPTION

I. Overview

The terms "payment product" and "card" may be used interchangeably herein to refer to a product, such as, for example, a credit card, a general purpose reloadable (GPR) card, and/or the like, that may be used to conduct financial transactions.

The term "service provider data" as used herein generally refers to data relating to one or more service providers, service provider systems, and/or services provided by one or more service providers. In some example embodiments herein, service provider data refers to any data that is stored in a wallet database and/or in a wallet client database.

The term "synchronization data" as used herein generally refers to data communicated to and/or from a wallet client and/or a wallet server. In some example embodiments herein, synchronization data is communicated between a wallet client and a wallet server during a periodic synchronization procedure.

Presented herein are novel and inventive systems, methods, and computer program products for integrating a mobile wallet with third party services. In accordance with some aspects described herein, a mobile wallet client provides a platform that enables NFC mobile payment channel as an alternative to traditional plastic based payment solutions. The wallet client enables a third party service provider (e.g., an issuer of a credit, debit, charge, and/or prepaid card) to offer any payment instrument that is traditionally offered as a plastic magnetic stripe product. The wallet client provides a secure servicing environment that provides the user with unique user experience features appropriate to the specific payment product type and customizable services offered by a service provider.

In one example aspect herein, the wallet client supports mobile web and/or mobile application servicing environments and enhances the user experience by enabling interaction with the service provider's online and/or mobile banking services either within or outside of the wallet client context. These services, in one example, are launched by invoking uniform resource locators (URLs) stored securely within a database of the wallet client.

In another example aspect herein, the servicing environment enables the user to perform multiple functions such as, for example, (1) adding a payment product; (2) viewing payment product details, which, in one example, may include accessing a mobile website and/or a mobile application of a service provider; (3) activating a payment product; (4) upgrading a general purpose reloadable (GPR) account; (5) adding funds to one or more accounts; and (6) removing a payment product.

In yet another example aspect herein, systems, methods, and computer program products are provided that enable multiple service providers to deliver custom notifications to mobile devices of their customers efficiently and effectively.

II. System

Figure 1:
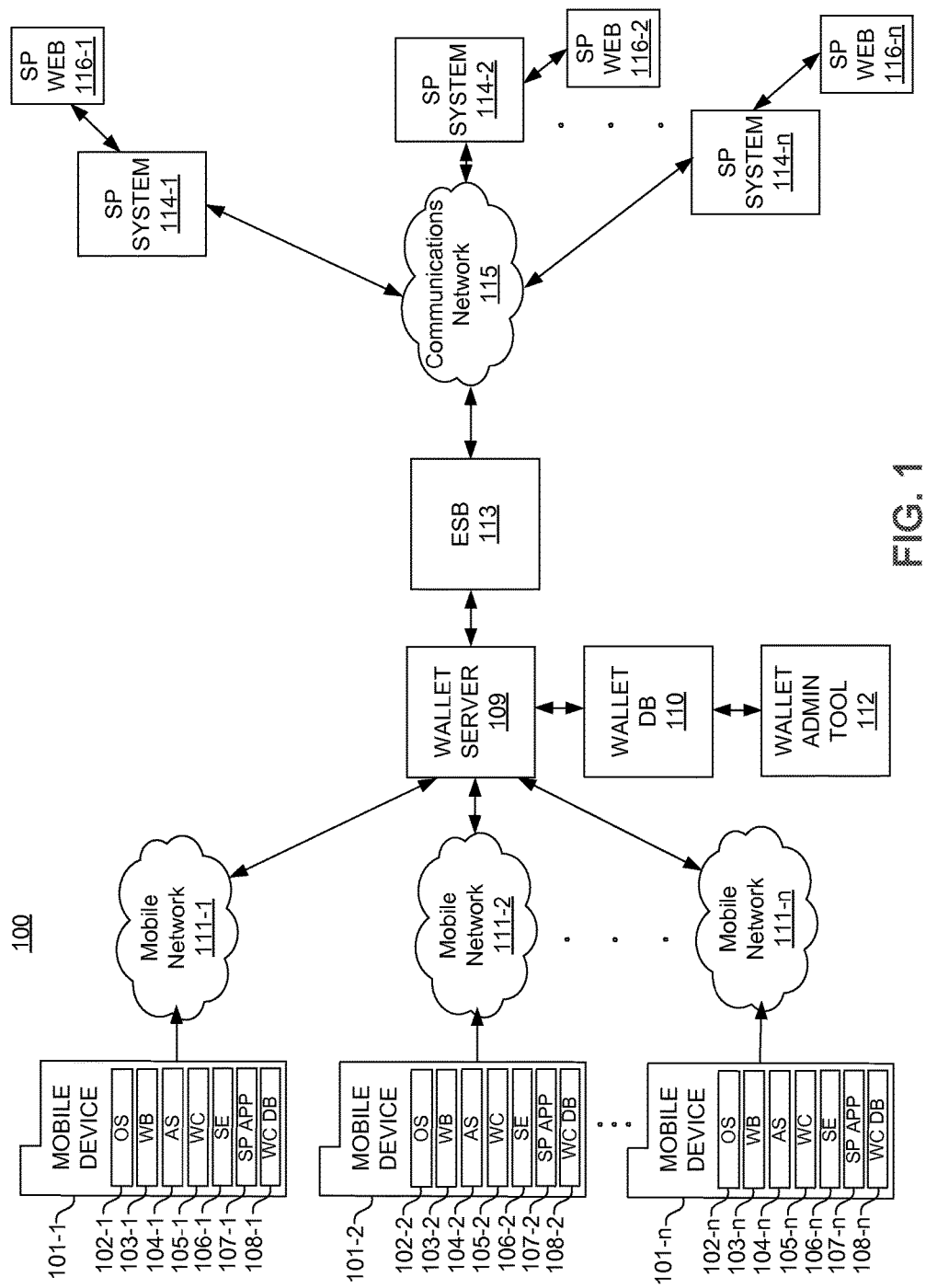
FIG. 1 is a diagram of an exemplary system for integrating a mobile wallet with third party (e.g., service provider) services, in accordance with various exemplary embodiments herein.

FIG. 1 is a diagram of an exemplary system 100 for integrating a mobile wallet with third party services (e.g., service provider services). The system 100 includes a plurality of mobile devices 101-1, 101-2 ... 101-n (collectively "101"), each of which may be a cellular phone, a tablet computer, or another type of electronic device with connectivity to one or more mobile networks. Each of the mobile devices 101 includes multiple components, which will be described in more detail below. In particular, each of the mobile devices 101 includes corresponding ones of mobile operating systems 102-1, 102-2 . . . 102-*n* (collectively "102"); mobile web browsers 103-1, 103-2 . . . 103-*n* (collectively "103"); mobile application stores 104-1, 104-2 . . . 104-*n* (collectively "104"); wallet clients 105-1, 105-2 . . . 105-*n* (collectively "105"); secure elements 106-1, 106-2 . . . 106-*n* (collectively "106"); service provider (SP) mobile applications 107-1, 107-2 . . . 107-*n* (collectively "107"); and wallet client databases 108-1, 108-2 . . . 108-*n* (collectively "108").

In the various example embodiments herein, the functionality of components will be described in the context of individual components (e.g., 101-1, 101-2 . . . 101-*n*) or in the context of plural components (e.g., 101). This is for convenience only, and should not be construed as limiting.

The mobile operating systems 102 manage hardware resources of the mobile devices 101 and provide common services for executing applications and/or programs on the mobile devices 101.

The mobile web browsers 103 are applications that retrieve content (e.g., websites and/or the webpages of websites) from the Internet, for example, and present the content via the mobile devices 101.

The mobile application stores 104 are applications that can be used to download and install mobile applications onto the mobile devices 101.

The wallet clients 105 (which may also be referred to as "mobile wallets") are interactive applications stored in non-transitory memories of a corresponding ones of the mobile devices 101. Each of the wallet clients 105 includes instructions that, when executed by a processor (not shown in FIG. 1) of the corresponding mobile device 101, enable a user to (1) access or use one or more services provided by service providers, (2) communicate with service providers, and/or (3) interact with contactless services and/or control the operation of contactless hardware of the mobile device 101, for example, to conduct contactless transactions and/or process commerce information such as offer and/or loyalty information.

The secure elements 106 are platforms onto which service account information and corresponding applications may be added and stored. The secure elements 106 include hardware and software, and implement interfaces and protocols that enable the secure storage of service account information and applications that may be used for conducting transactions. The secure elements 106 may be implemented in different form factors, such as, for example, Universal Integrated Circuit Cards (UICC), embedded secure elements, and/or a separate chips or secure devices (e.g., a near-field communication (NFC) enabler) that can be inserted into slots on the mobile devices 101. In one example embodiment, the wallet clients 105 communicate with the corresponding secure elements 106 using ISO 7816 commands, in order to conduct contactless transactions.

The SP mobile applications 107 are applications provided by service providers and stored in non-transitory memories of corresponding ones of the mobile devices 101. Each of the SP mobile applications 107 includes instructions that, when executed by a processor (not shown in FIG. 1) of the corresponding mobile device 101, enable a user of the mobile device 101 to communicate with, and/or utilize one or more services provided by, the service provider. For example, an SP mobile application 107 provided by a payment product issuer, may enable the user to check a balance of the user's account, view transaction history and/or other notifications regarding the user's account, and/or or the like.

The wallet client databases 108 store data (e.g., service provider data) that the wallet clients 105 utilize to perform certain functions. For instance, the wallet client databases 108 may store SP mobile application data regarding one or more SP mobile application(s) (e.g., the SP mobile applications 107 described above) that the wallet clients 105 use to access and/or interact with the SP mobile applications 107. The wallet client databases 108 may also store SP mobile website data regarding one or more SP mobile website(s) (e.g., the SP mobile websites 116 described below) that the wallet clients 105 use to access and/or interact with the SP mobile websites 116. In one example embodiment, the wallet client databases 108 store preference data regarding one or more preferences for whether to launch the SP mobile applications 107, the SP mobile websites 116, or the mobile application stores 104 in response to options being selected via the mobile devices 101 (e.g., via hard or soft buttons).

Storing data (e.g., service provider data, such as SP mobile application data, SP mobile website data, and/or preference data) in the databases 108 in this manner enables the wallet clients 105 to execute certain functions (e.g., accessing the SP mobile applications 107 and/or the SP mobile websites 116) without the need to obtain certain information (e.g., URLs) from the wallet server 109 (described below), the SP systems 114 (described below), and/or other systems each time the functions are executed.

Although not shown in FIG. 1 for purposes of convenience, the mobile devices 101 may also include corresponding user interfaces, such as interactive touchscreen displays and/or keyboards.

The system 100 also includes a wallet server 109 (which may also be referred to as a "mobile wallet server" or a "server") and a wallet database 110, which are mutually communicatively coupled. The wallet server 109 is also communicatively coupled to each of the plurality of mobile devices 101-1, 101-2 . . . 101-*n* by way of a corresponding one of a plurality of mobile networks 111-1, 111-2 . . . 111-*n* (collectively "111"). The mobile networks 111 may be mobile phone cellular networks, radio networks, and/or other types of networks, each of which may be operated by a corresponding mobile network operator (MNO) (not shown in FIG. 1).

The wallet server 109 manages communications with the wallet clients 105, tracks the states of the wallet clients 105 (e.g., by storing states of the wallet client 105 in the wallet database 110), and provides interfaces for communication with other computer systems. The wallet server 109 communicates with the mobile devices 101 via the mobile networks 111 using, for example, security protocols such as GlobalPlatform secure channel protocol, secure sockets layer (SSL), transport layer security (TLS), and/or another security protocol.

The wallet database 110 stores data that the wallet server 109 utilizes to perform one or more functions. For instance, the wallet database 110 may store wallet client state data that indicates the states of each of the wallet clients 105. In one example embodiment, one or more SP systems 114 (described below) can query the wallet server 109 for wallet client state data corresponding to a particular one of the wallet clients 105. In response to receiving the query for wallet client state data from one or more SP systems 114, the wallet server 109 retrieves wallet client state data from the wallet database 110 and provides the retrieved wallet client state data to the SP system(s) 114 from which the query was received.

In some example embodiments, the wallet database 110 stores the data (e.g., service provider data) that, as mentioned above, is also stored in the plurality of wallet client databases 108. In this manner, the wallet database 110 can serve as a backup of the wallet client databases 108, and can be used to reconfigure one or more of the wallet client databases 108 in the event of the failure of one or more of the wallet client databases 108.

In one example embodiment, the system 100 also includes a wallet administration tool 112 that is communicatively coupled to the wallet database 110. The wallet administration tool 112 provides an interface for inputting and/or storing data in the database 110 that the wallet server 109 may utilize to perform one or more functions, such as, for instance, launching the SP mobile applications 107 and/or the SP mobile websites 116. An example procedure for inputting (e.g., via the administration tool 112) and/or utilizing (e.g., by the wallet client 105 and/or another component of the mobile device 101) data that may be used to launch the SP mobile applications 107 and/or the SP mobile websites 116 will be described below in the context of FIG. 3.

The system 100 also includes an enterprise service bus (ESB) 113 and a plurality of service provider (SP) systems 114-1, 114-2 . . . 114-n (collectively "114"). The ESB 113 is communicatively coupled to each of the SP systems 114 by way of a communications network 115, and is communicatively coupled to the wallet server 109 by a secured communication channel. The communications network 115 may be a virtual private network (VPN), a network using Hypertext Transfer Protocol (HTTP) standards, the Internet, and/or another type of network.

The ESB 113 acts as an intermediary between the mobile devices 101 and the SP systems 114. In particular, the ESB 113 routes service requests from one or more first systems (e.g., mobile devices 101) to one or more second systems (e.g., SP systems 114), and orchestrates processes among such systems, for example, to provide integrated access to third party services via the wallet clients 102. In some example embodiments, the system 100 does not include the ESB 113 and the functions implemented by the ESB 113 are implemented by the wallet server 109 instead.

In some example embodiments, the SP systems 114 are systems owned, operated, maintained, and/or provided by service providers to enable customers or consumers to utilize one or more services of the service provider. In one example, the SP systems 114 support a defined set of messages for communication with the ESB 113. In another example, the SP systems 114 include and/or host an interactive SP website (e.g., a conventional website and/or a mobile version of a website, such as the SP mobile websites 116 described below) that responds to HTTP requests and delivers webpages formatted for display on the mobile devices 101.

The system 100 includes, in one example embodiment, a plurality of SP mobile websites 116-1, 116-2 . . . 116-n (collectively "116") communicatively coupled to corresponding ones of the SP systems 114-1, 114-2 . . . 114-n (collectively "114"). The SP mobile websites 116 are hosted by corresponding service providers and include one or more mobile webpages (e.g., URLs) accessible by the mobile devices 101.

III. Procedure

Figure 2:
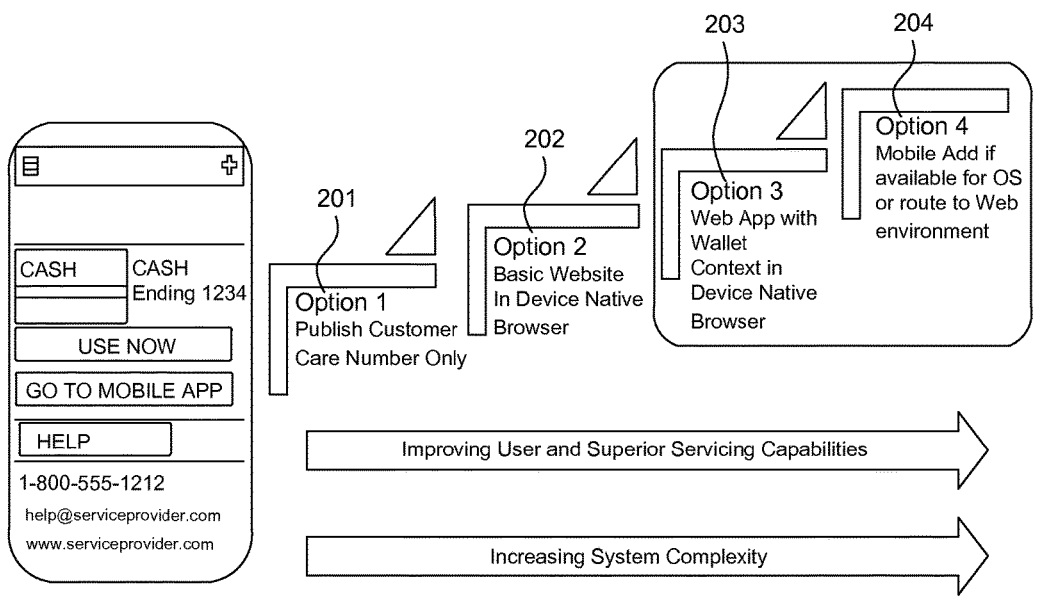
FIG. 2 shows example options for providing access to third party services by way of a wallet client, in accordance with an example embodiment herein.

Having described an exemplary system for integrating a mobile wallet with one or more third party (e.g., service provider) services, reference will now be made to FIG. 2 to describe options for providing access to third party services by way of the wallet client 105.

In accordance with various example embodiments herein, several servicing environment options (i.e., options for providing access to third party services by way of the wallet client 105) are provided, each of which can be configured and/or customized according to service provider preferences and/or according to the types and/or capabilities of the mobile devices 101. Four exemplary options for providing access to third party services by way of the wallet client 105 are shown in FIG. 2:

(1) Publishing customer care telephone numbers via the wallet clients 105 (option 201);

(2) Providing access to service provider websites 116 via the wallet clients 105 (option 202);

(3) Providing access to service provider web applications (e.g., as part of websites 116) within the context of the wallet clients 105 (option 203); and (4) Providing access to mobile device applications 107 of the service provider, if the mobile device applications 107 are installed on the mobile devices 101 (option 204).

In one example, if the SP mobile device applications 107 are not installed on the mobile devices 101, then the mobile application stores 104 of the mobile devices 101 are launched and the SP mobile applications 107 are downloaded and installed onto the mobile devices 101.

Providing these servicing environment options via the wallet clients 105 provides users with an integrated and unique user experience including access to features that may be tailored to a specific payment product type as well as customizable services offered by service providers. By supporting mobile web and/or mobile application servicing environments, the mobile wallets 105 enables user interaction with the service providers' online and/or mobile banking services either within or outside of the wallet client context, thus enhancing the user experience.

In one example embodiment, in order to support the above-mentioned servicing environment options, one or more of the data elements shown below in Table 1, Table 2, and/or Table 3 are provided to, or by, each of the service providers associated with the service provider systems 114, for example, during an onboarding process (e.g., during an initial configuration of one or more payment products on one or more of the components 101, 102, 103, 104, 105, 106, 107, 109, 113, and 114 (FIG. 1)):

TABLE 1

| Data Element | Mandatory/Optional | Description |
| --- | --- | --- |
| Service Provider Name | Mandatory | Text used to identify service provider in directory |
| Service Provider Listing | Optional | Additional text field within service provider listing in directory |
| Card Program Name | Mandatory for each unique payment product | Name of the payment product |
| Card Concise Name | Optional | Abbreviated name of the payment product used on the post tap summary screen |

TABLE 1-continued

| Data Element | Mandatory/Optional | Description |
|---|---|---|
| Customer Care Phone Number(s) Account Online URL E-mail | All optional | Displayed on the card details page; contact information may appear on the back of the card page if the card is in a blocked or other non-active state |
| URL to Card Registration Webpage or Mobile App Link | Mandatory (static or dynamic URL integration) | Links to service provider registration page where consumers onboard cards into the mobile wallet |
| URL to Card Activation Service | Conditional (if service provider requires activation of newly added cards) | Link to service provider card activation tool |
| URL to Card Servicing (Account Online or Mobile App) | Optional | Link to account online servicing tool |
| Card Art | Mandatory | Card image displayed in the wallet to represent the service provider's payment product |
| Service Provider Logo | Mandatory | Logo to identify service provider in the directory |
| Return to Wallet URL | To be provided to service provider | Links the consumer back to the mobile wallet |

TABLE 2

| Soft Card Data Element | Mandatory/ Optional | Description |
|---|---|---|
| Card Ending Digits Last 4 or 5 | Mandatory | Must be provided for each payment card provisioned |
| Expiry Date | Optional | Placed on card rear |
| Current Balance | Optional | Placed on card rear |
| Available Credit | Optional | Placed on card rear |
| Card State | Mandatory | Represents the status of the corresponding card |

TABLE 3

| Platform | Platform-based Data Element |
|---|---|
| Android | App package name (e.g., com.bankx.mobile) App activity class name (e.g., com.bankx.mobile.MainActivity) Preference: mobile website or mobile app Mobile website URL (if preference is mobile website) |
| iOS | URL schema name (e.g., bankx) App name (e.g., bankx-mobile-app) Preference: mobile website or mobile application Mobile website URL (if preference is mobile website |

Although Table 3 shows different URL schemes for Android and iOS platforms, in one example embodiment, both Android and iOS platforms support the same URL scheme (e.g., the scheme shown in Table 3 for the iOS platform). In this manner, a structured data object ("SDO"; described in further detail below) may be used to link to a mobile application, independently of any platform.

In another example embodiment, during the onboarding process the service providers associated with the service provider systems 114 may provide to the wallet administration tool 112 automatic login information and/or user context information. This may enable the user to automatically login to a website 116, mobile website 116, and/or mobile application 107 of the service provider, without having to enter the information manually. This may also enable the service provider to present the website 116, mobile website 116, and/or mobile application 107 to the user in a user context that the user and/or the service provider have predefined.

Figure 3:
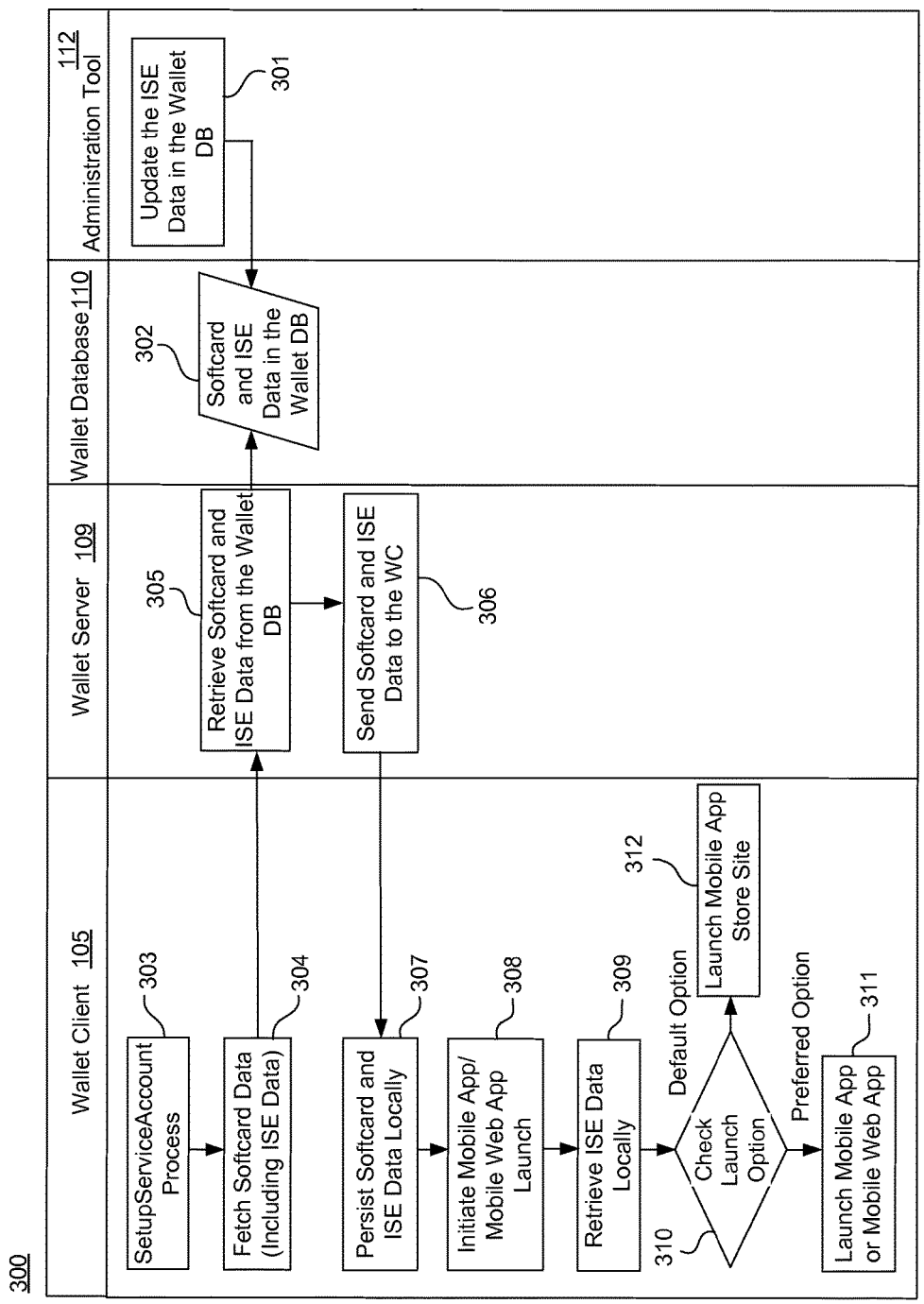
FIG. 3 shows an example procedure for inputting and/or utilizing one or more data elements to support servicing environment options, in accordance with an example embodiment herein.

FIG. 3 shows an example procedure 300 (e.g., including an example onboarding process) for inputting and/or utilizing one or more of the data elements (e.g., the data elements shown above in Table 1, Table 2, and/or Table 3) to support the above-mentioned servicing environment options.

At block 301 one or more data elements (e.g., the data elements shown above in Table 1, Table 2, and/or Table 3) is inputted (e.g., by a system administrator) into the wallet administration tool 112. At block 302, the wallet administration tool 112 stores the data elements inputted at block 301 in the wallet database 110.

At block 303, a setup service account process is launched via the wallet client 105, for example, when a user selects an option to add a payment product to the wallet client 105 is selected.

The wallet client 105, at block 304, requests the wallet server 109 to fetch one or more data elements (e.g., the data elements shown above in Table 1, Table 2, and/or Table 3) from the wallet database 110. At block 305, the wallet server 109 fetches from the wallet database 110 the one or more data elements requested by the wallet client 105 at block 304. At block 306, the wallet server 109 transmits to the wallet client 105 the one or more data elements fetched at block 305. At block 307, the wallet client 105 stores, in the wallet client database 108, the one or more data elements transmitted by the wallet server 109 at block 306.

The wallet client 105, at block 308, initiates the SP mobile application 107 or the mobile website 116. At block 309, the wallet client 105 retrieves the data stored at block 307 in the wallet client database 108.

At block 310, the wallet client 105 makes preference determinations based on the data retrieved at block 309. For instance, the wallet client 105 may determine whether the data retrieved at block 309 includes preference data indicating a preference for launching the SP mobile application 107 or the mobile website 116. If, the wallet client 105 determines at block 310 that the preference data indicates a preference for launching the mobile SP mobile application 107, then the wallet client 105 launches the SP mobile application 107 at block 311. If, on the other hand, the wallet client 105 determines at block 310 that the preference data indicates a preference for launching the SP mobile website 116, then the wallet client 105 launches the SP mobile website 116 at block 311. If the wallet client 105 determines at block 310 that the data retrieved at block 309 does not include any preference data (or that the SP mobile application 107 is not installed on the wallet client 105), then the wallet client 105 launches the mobile application store 104 at block 312.

A. Interfaces Used for SP Servicing Environment

Having described an example procedure for inputting data elements to support servicing environment options, reference will now be made to FIGS. 3 through 6 to describe example interfaces that may be employed, in accordance with various example embodiments herein, to provide such servicing environment options.

1. SP System Interface

Figure 4:
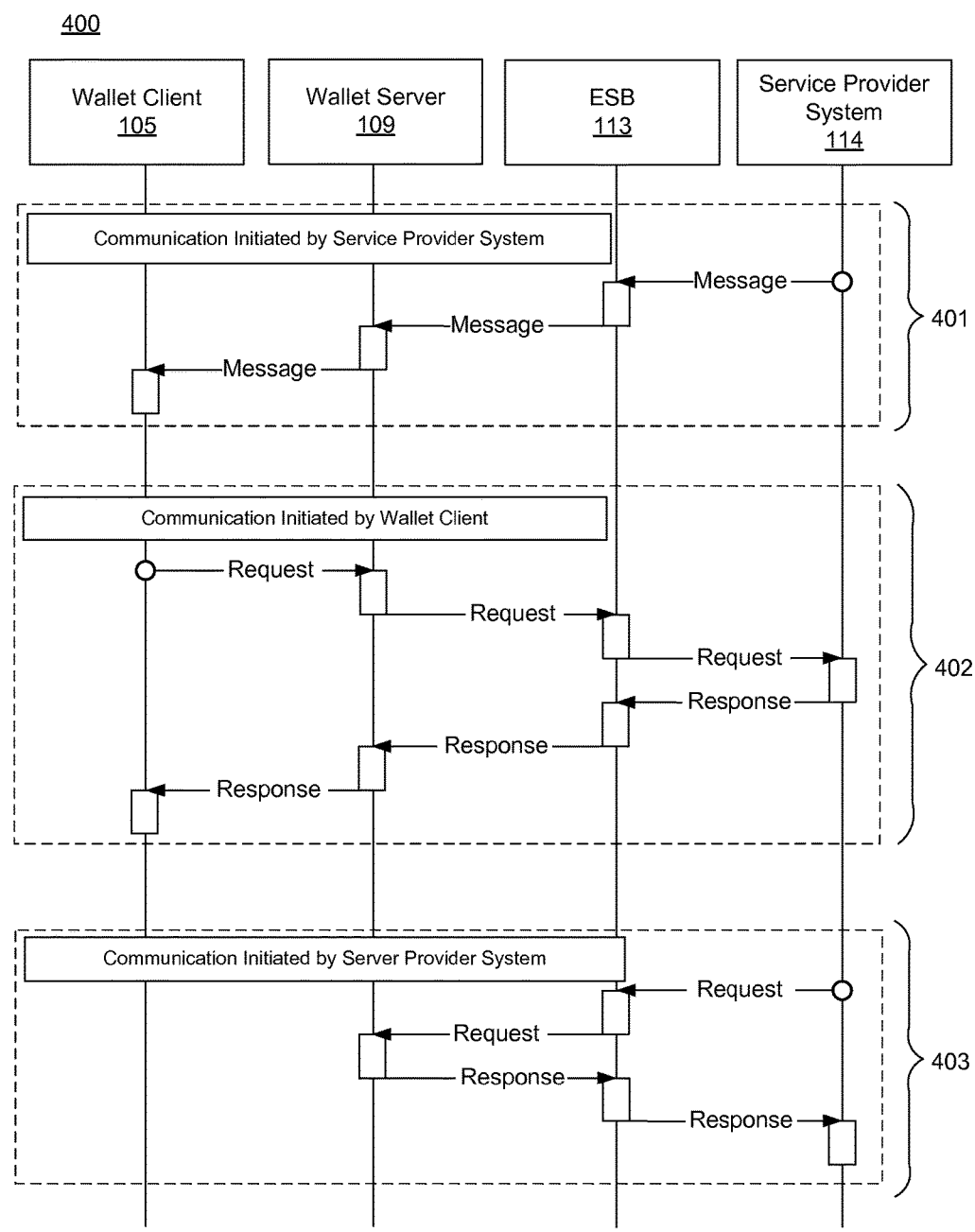
FIG. 4 shows a representative interface for exchanging data between a wallet client, a wallet server, an ESB, and an SP system, in accordance with an example embodiment herein.

FIG. 4 shows a representative interface 400 for exchanging data between the wallet client 105, the wallet server 109, the ESB 113, and the SP system 114, in accordance with various example embodiments herein. Three exemplary data flows 401, 402, and 403 shown in FIG. 4 demonstrate ways in which the wallet client 105, the wallet server 109, the ESB 113, and the SP system 114 may communicate data such as messages, requests, and/or responses via the interface 400. In the data flow 401, the service provider system 114 transmits a message to the wallet client 105 by way of the ESB 113 and the wallet server 109.

In the data flow 402, the wallet client 105 transmits a request to the service provider system 114 by way of the wallet server 109 and the ESB 113. In reply, the service provider system 114 transmits a response to the wallet client 105 by way of the ESB 113 and the wallet server 109.

In the data flow 403, the service provider system 114 transmits a request to the wallet server 109 by way of the ESB 113. In reply, the wallet server 109 transmits a response to the service provider system 114 by way of the ESB 113. In one example embodiment, the request is a request to update a state of contactless services tracked and stored by the wallet server 109. In another example embodiment, the request is a query of the state of one or more of the wallet clients 105 tracked and stored by the wallet server 109. The wallet server 109 may also communicate data from these messages to one or more of the wallet clients 105, in accordance with some example aspects herein.

2. SP Mobile Website Interface

Figure 5:
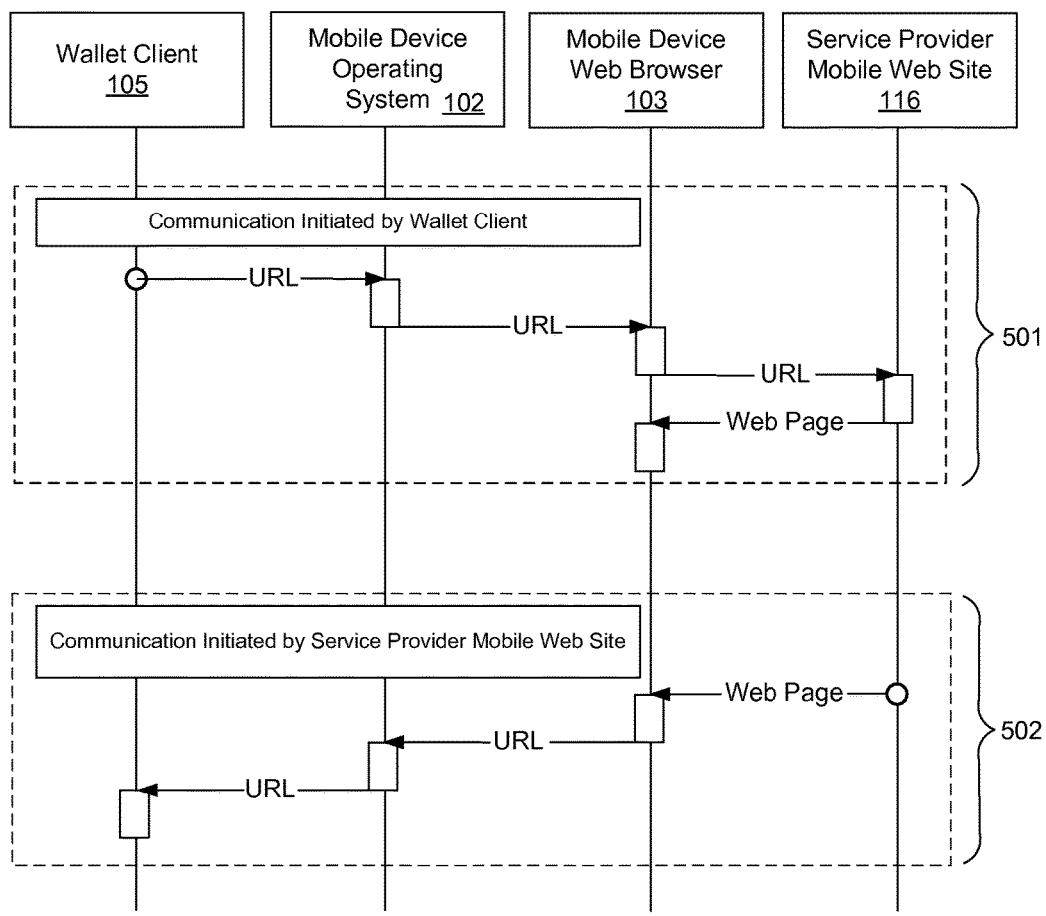
FIG. 5 shows a representative interface for exchanging data between a wallet client, a mobile device operating system, a mobile device web browser, and an SP website, in accordance with an example embodiment herein.

FIG. 5 shows a representative interface 500 for exchanging data between the wallet client 105, the mobile device operating system 102, the mobile device web browser 103, and the SP website 114, in accordance with various example embodiments herein. In one exemplary embodiment, data is communicated via the interface 500 to enable the wallet client 105 to invoke the mobile device web browser 103 and to provide a URL to the web browser 103 directing the web browser 103 to load and present one or more SP webpages via the mobile device 101.

Two exemplary data flows 501 and 502 are shown in FIG. 5 to demonstrate ways in which the wallet client 105, the mobile device operating system 102, the mobile device web browser 103, and the SP website 114 may communicate data such as URLs and/or webpages via the interface 500. In the data flow 501, the wallet client 105 transmits a URL to the SP website 114 by way of the mobile device operating system 102 and the mobile device web browser 103. As described above in the context of FIG. 3, this URL may be stored in the wallet client database 108 and/or in the wallet database 110. In reply, the SP website 114 transmits a webpage (e.g., a website corresponding to the URL transmitted by the wallet client 105) to the mobile device web browser 103.

In the data flow 502, the SP website 114 transmits a webpage to the mobile device web browser 103, which, in turn, transmits a URL (e.g., a URL corresponding to the webpage transmitted by the SP website 114) to the wallet client 105 by way of the mobile device operating system 102. In one example embodiment, this URL directing the web browser 103 to load and display a webpage from the SP mobile website 114 is delivered to the wallet client 102 via the interface 400 (FIG. 4) and is stored in the wallet client database 108. In another example embodiment, the interface 500 defines a set of parameters that the wallet client 105 may embed in the URL to be passed by the web browser 103 to the SP mobile website 114.

In another example aspect, the wallet client 105 registers a predefined URL format with the mobile device operating system 102, so that any request made using the predefined URL format causes the mobile device operating system 102 to invoke the wallet client 105. The wallet client 105 also may register with the mobile device operating system 102 predefined parameters that may be embedded in the URL. Upon receiving the URL, the wallet client 105 interprets any predefined parameters embedded therein. In another example embodiment, the SP mobile website 114 includes the URL in a link on a webpage that the SP mobile website 114 delivers to the mobile device 101. In this manner, when a user selects the link, the mobile device operating system 102 switches contexts from a context of the web browser 103 to a context of the wallet client 105, and delivers the URL to the wallet client 105.

3. SP Mobile Application Interface

Figure 6:
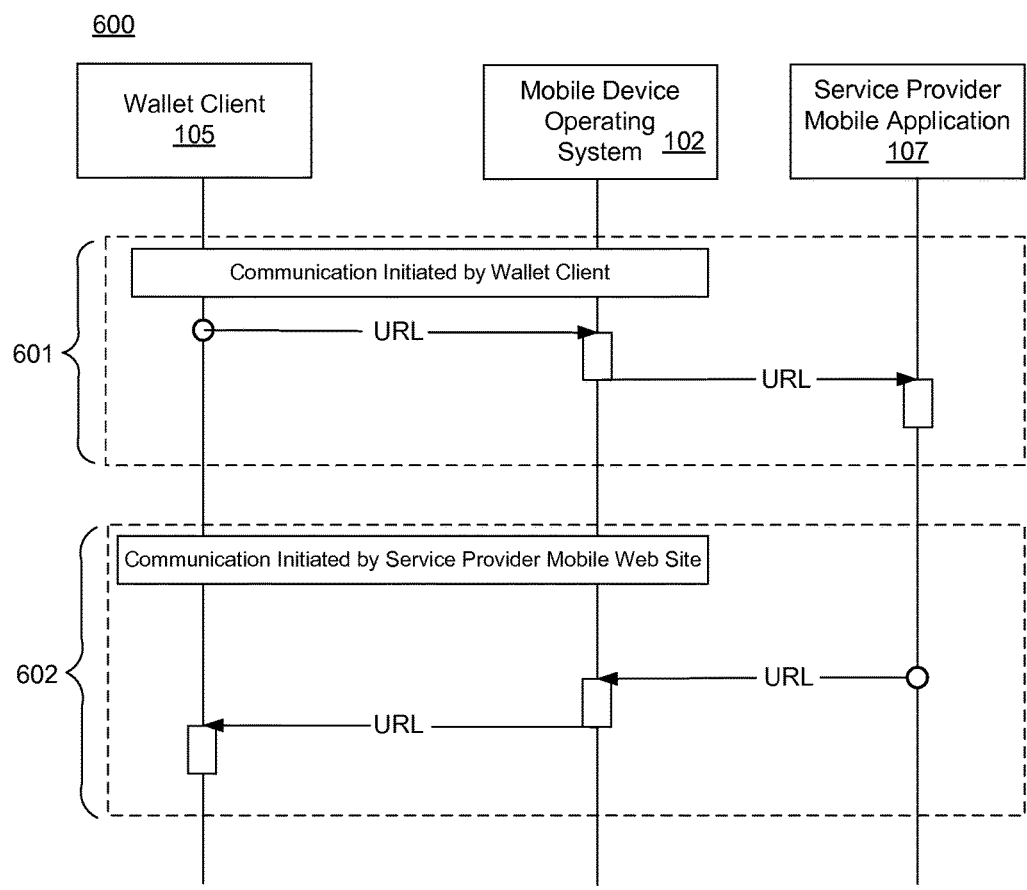
FIG. 6 shows a representative interface for exchanging data between a wallet client, a mobile device operating system, and a service provider mobile application, in accordance with an example embodiment herein.

FIG. 6 shows a representative interface 600 for exchanging data between the wallet client 105, the mobile device operating system 102, and the service provider mobile application 107, in accordance with various example embodiments herein. In one exemplary embodiment, data is communicated via the interface 600 to (1) enable the wallet client 105 to invoke the SP mobile application 107, if the SP mobile application 107 has been installed on the wallet client 105; and/or (2) to enable the mobile device operating system 102 to switch between a context of the wallet client 105 and a context of the SP mobile application 107.

Two exemplary data flows 601 and 602 are shown in FIG. 6 to demonstrate ways in which the wallet client 105, the mobile device operating system 102, and the SP mobile application 107 may communicate data such as URLs via the interface 600. In the data flow 601, the wallet client 105 transmits a URL (e.g., a URL of the wallet client 105) to the SP mobile application 107 by way of the mobile device operating system 102. In the flow 602, the SP mobile application 107 transmits a URL (e.g., a URL of the SP mobile application 107) to the wallet client 105 by way of the mobile device operating system 102. As described above in the context of FIG. 3, the URL(s) transmitted in the flow 601 and/or the flow 602 may be stored in the wallet client database 108 and/or in the wallet database 110.

In one example embodiment, the SP mobile application 107 registers a predefined URL format (a format of the URL of the SP mobile application 107) with the mobile device operating system 102, so that any request made using the predefined URL format causes the mobile device operating system 102 to invoke the SP mobile application 107. The SP system 114 provides the predefined URL format to the wallet client 102 via the interface 400 described above in the context of FIG. 4, in one example.

The SP mobile application 107 may also register with the mobile device operating system 102 predefined parameters that the wallet client 105 may embed in the URL of the SP mobile application 107. Upon receiving the URL of the SP mobile application 107 from the wallet client 105 (by way of the mobile device operating system 102), the SP mobile application 107 interprets any predefined parameters embedded therein. In another example embodiment, the mobile device 101 displays a link corresponding to the URL of the SP mobile application 107. When a user selects the link, the mobile device operating system 102 switches contexts from a context of the wallet client 105 to a context of the SP mobile application 107.

In another example embodiment, the wallet client 105 registers a predefined URL format (e.g., a format of a URL of the wallet client 105) with the mobile device operating system 102, so that any request made using the predefined URL format causes the mobile device operating system 102 to invoke the wallet client 105.

The wallet client 102 may also register with the mobile device operating system 102 predefined parameters that the SP mobile application 107 may embed in the URL of the wallet client 105. Upon receiving the URL of the wallet client 105 from the SP mobile application 105, the wallet client 105 interprets any predefined parameters embedded therein. In another example embodiment, the mobile device 101 displays a link corresponding to the URL of the wallet client 105. When a user selects the link, the mobile device operating system 102 switches contexts from a context of the SP mobile application 107 to a context of the wallet client 105, and delivers the URL of the wallet client 105 to the wallet client 105.

4. Application Store Interface

Figure 7:
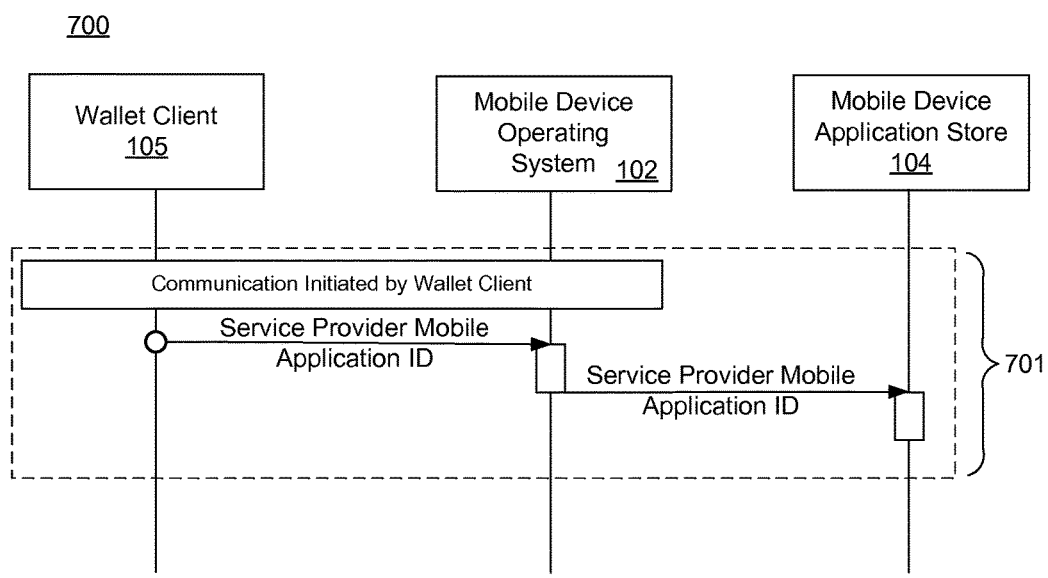
FIG. 7 shows a representative interface for exchanging data between a wallet client, a mobile device operating system, and a mobile application store, in accordance with an example embodiment herein.

FIG. 7 shows a representative interface 700 for exchanging data between the wallet client 105, the mobile device operating system 102, and the mobile application store 104, in accordance with various example embodiments herein. In one exemplary embodiment, if the SP mobile application 104 has not yet been installed on the mobile device 101, then data is communicated via the interface 700 to enable the wallet client 102 to invoke the mobile application store 104 provided by the mobile device operating system 102 and to download and/or install the SP mobile application 104 therefrom.

An exemplary data flow 701 is shown in FIG. 7 to demonstrate a way in which the wallet client 105, the mobile device operating system 102, and the mobile device application store 104 may communicate data such as an SP mobile application identifier via the interface 600. In the data flow 601, the wallet client 105 transmits an SP mobile application identifier (e.g., an identifier corresponding to the SP mobile application 107) to the mobile application store 104 by way of the mobile device operating system 102. In one example, the SP system 114 transmits the SP mobile application identifier to the wallet client 102 via the interface 400 described above (FIG. 4), to enable the wallet client to invoke the mobile application store 104.

5. SP System-to-Mobile Website Interface and SP System-to-SP Application Interface In some example embodiments herein, the service provider(s) systems 114 implement proprietary interfaces for communicating data between the SP systems 114 and the SP mobile website(s) (not shown in FIGS. 1 through 6) and/or SP mobile applications 107. The interfaces 400, 500, 600, and 700 may be used together in conjunction with the proprietary interfaces implemented by service provider systems 114 to perform complex operations. For example, the wallet client 105 may provide a parameter to the SP mobile website via the interface 500 (FIG. 5), and the parameter can be passed to the SP system 114 and used by the SP system 114 to query the wallet server 109 via the interface 400 (FIG. 4) to return additional data about the wallet client 105. The SP system 114 may return this additional data to the SP mobile website to allow it to generate a webpage that relates to the specific wallet client 105 that initiated the process.

B. Payment Product Functions/Use Cases supported by SP Servicing Environment

Having described example interfaces that may be employed to provide servicing environment options by way of the wallet client 105, reference will now be made to FIG. 8 to describe example payment product functions or use cases supported by the SP servicing environment.

Figure 8:
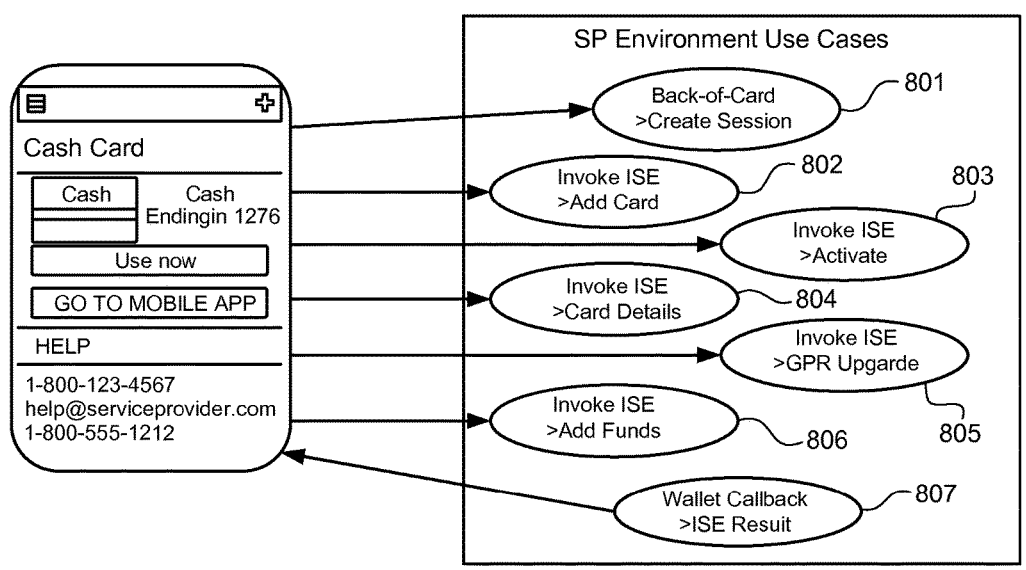
FIG. 8 shows example payment product functions or use cases supported by an SP servicing environment, in accordance with an example embodiment herein.

As shown in FIG. 8, example use cases or payment product functions supported by the SP servicing environment include the following:

(1) Creating a session (801);

(2) Adding a payment product (e.g., a card) to the wallet client 105 (802);

(3) Activating a payment product on the wallet client 105 (803);

(4) Obtaining/presenting card details via the wallet client 105 (804);

(5) Upgrading a general purpose reloadable (GPR) payment product on the wallet client 105 (805);

(6) Adding funds to a payment product (806); and (7) Calling back to the wallet client 105 (807).

C. SP Servicing Environment Lifecycle

Having described example use cases or payment product functions supported by the SP servicing environment, an exemplary SP servicing environment lifecycle will now be described. In one example embodiment, the SP servicing environment lifecycle proceeds according to the following steps: (1) authentication; (2) session establishment; (3) invocation of the SP servicing environment by the wallet client 105 (e.g., to execute one or more of the payment product functions described above in connection with FIG. 8); and (4) callback to the wallet client 105.

1. Authentication

Having described example use cases or payment product functions supported by the SP servicing environment, exemplary procedures will now be described for authenticating a user via the wallet client 105 to provide the SP servicing environment.

In one example embodiment, a user can be authenticated by using one of two authentication procedures, and each of a plurality of service providers may select and/or configure the authentication procedures to be used for their customers, for example, based on the platforms (such as the operating systems 102) of the mobile devices 101 of the customers.

In a first authentication procedure, no session information is created or shared among the wallet client 105, the wallet server 109, the ESB 113, the wallet administration tool 112, and/or the wallet database 110. The wallet client 105 statically signs servicing URLs (i.e., URLs used for providing SP services via the wallet client 105) and provides a context to the SP system 114. The SP system 114 authenticates the user within an SP servicing environment.

In a second authentication procedure, referred to as a single-sign-on (SSO) authentication procedure, for each servicing request, a session key is created between the SP system 114 and one or more of the wallet client 105, the wallet server 109, the ESB 113, the wallet administration tool 112, and/or the wallet database 110. A session handle is provided by the SP system 114 to link the servicing request to a particular wallet client 105. The wallet client 105 statically signs servicing URLs and transmits an authenticated and secure context to the SP system 114. The SP system 114 manages the duration of the session.

In one example embodiment, during an onboarding process each of the service providers associated with the service provider systems 114 provide, to the wallet server 109 and/or the ESB 113, authentication configuration data, such as one or more base URLs, authentication procedures, and/or URL signatures, for each handset platform type (e.g., for each type of operating system 102). The base URLs are signed and stored, for example, in the wallet database 110. Table 4 shows exemplary authentication configuration data (e.g., URLs, authentication procedures, and/or URL signatures) that service providers may provide during an onboarding process.

TABLE 4

| Service Provider | Mobile Device Operating System | Base URL | Authentication Procedure | URL Signature |
|---|---|---|---|---|
| SP 1 | OS 1 | https://www.SP1.com/mobilewallet/OS1 | SSO | a0bc1def2a3a4b5b6cc7dd8ee9ffa0bc1def2a3a4b5b6cc7dd8ee9ffa0bc1def |
| SP 1 | OS 2 | https://www.SP1.com/mobilewallet/OS2 | SSO | c34d45e56f7a6b78c3cd48d5446e4e323fff4f5fa6a34b2b54c569cd4d3aa6c5 |
| SP 2 | OS 1 | https://www.SP2.com/mobilewallet/OS1 | No Authentication | 9adafcd3dbd7ca54ecbea6cb58ca3fb8365a839ff27a463a829a4739a36ab7fc |
| SP 2 | OS 2 | https://www.SP2.com/mobilewallet/OS2 | No Authentication | 7ffcfabb3fcb6a38a54a6b7aa38cac37593bb6d2d5e6ee284639464a92a6fabf |

When invoked, the wallet client 105 validates the URL signature and creates a request based on the base URL and a context related to the requested action (for instance, whether the requested action is a request for card details, a GPR upgrade, and/or another function supported by the wallet client 105). The wallet client 105 adds parameters to the request based on the authentication procedure configured by the service provider (e.g., no authentication or an SSO authentication procedure). The use of URL signatures and URL validation by the wallet provides security by ensuring that the URL provided by the service provider during the onboarding process is invoked, unmodified.

2. Session Establishment

Figure 9:
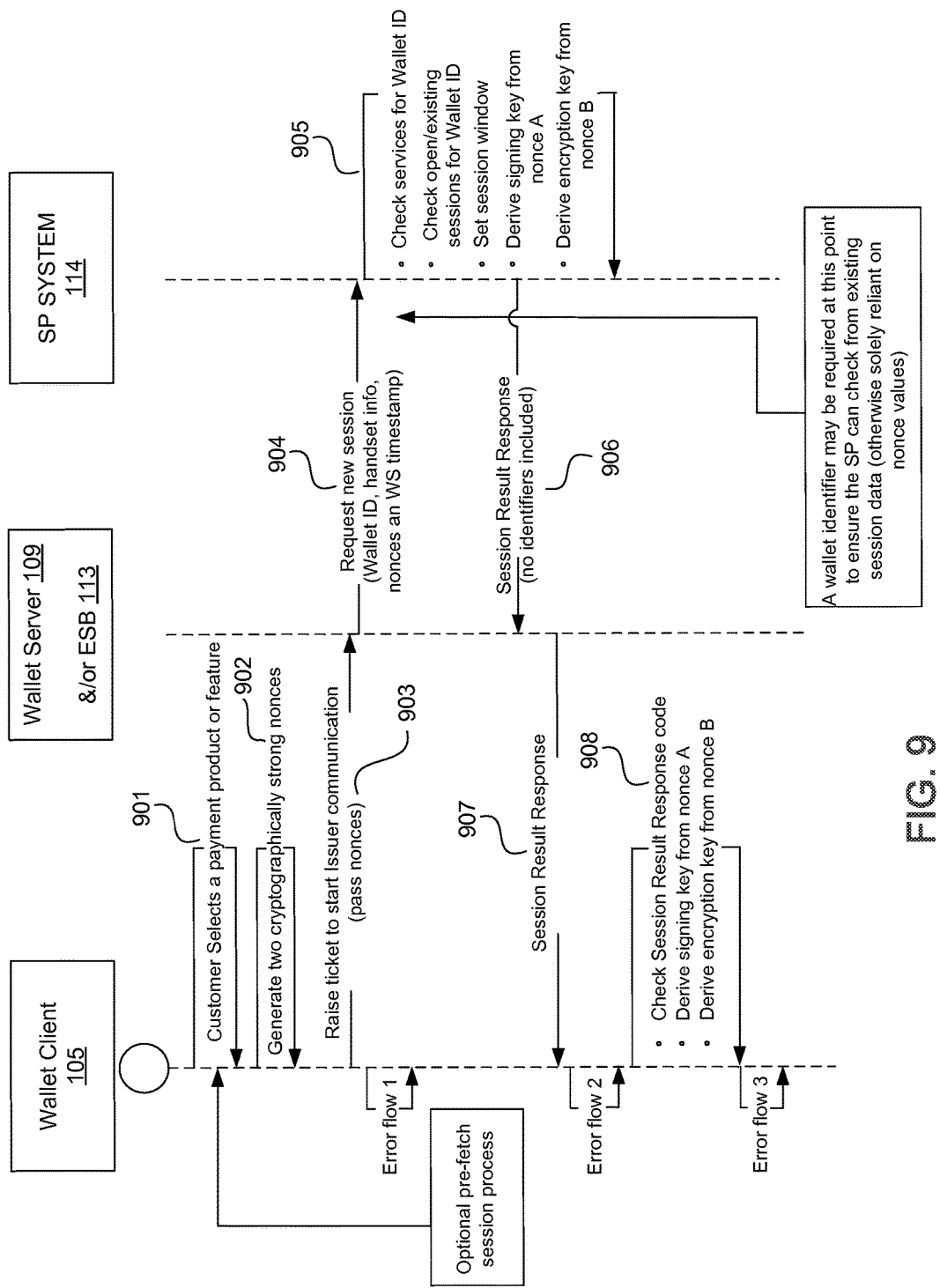
FIG. 9 shows an exemplary procedure for establishing a session between a wallet client and an SP system using an SSO authentication procedure, in accordance with an example embodiment herein.

Having described exemplary procedures for authenticating a user via the wallet client 105, an exemplary procedure for establishing a session between the wallet client 105 and the SP system 114 using the SSO authentication procedure will now be described, with reference to FIG. 9. Establishing a session in the following manner provides security for the wallet client 105 and the SP system 114 during interactions that occur over untrusted networks (e.g., the communications network 115 and/or the mobile networks 111). In particular, the establishment of a session between the wallet client 105 and the SP system 114 provides a basis for trust in subsequent interactions between the wallet client 105 and the SP system 114. It establishes the identity of the wallet client 105 and establishes shared secrets that may be required to secure privacy, identity, and/or integrity of subsequent communications.

In one example embodiment, prior to step 901, (1) the wallet client 105 is in an authenticated state (e.g., by having executed one of the authentication procedures described above), (2) the wallet client 105 is synchronized with the wallet server 109, and (3) a secure communication channel has been established between the wallet server 109 and the SP system 114.

At step 901, when a user selects a payment product associated with the service provider system 114, the wallet client 105 requests that a session be established. This allows session keys to be immediately available when the user selects a specific function such as launching the SP mobile website 116 or adding funds to the selected payment product.

At step 902, the wallet client 105 generates two cryptographically strong nonces (e.g., nonce A and nonce B), which are arbitrary and/or pseudorandom numbers each used only once in a communication. In one example embodiment, the wallet client 105 uses an API for generating a pseudorandom number to generate a 32 bit nonce, as shown in the following example code segment:

Nonce :=SecureRandom( ):32B

At step 903, the wallet client 105 transmits a request for session establishment (e.g., in connection with a request to implement a function such as the functions/use cases described above in the context of FIG. 8) to the wallet server 109. In one example embodiment, the request for session establishment includes (1) the nonces generated at step 902, (2) a cryptographic ticket scheme, (3) a wallet identifier corresponding to the wallet client 105, (4) a mobile device number corresponding to the mobile device 101, (5) a service provider identifier, and/or (6) a timestamp indicating when the wallet server 109 receives the request. The wallet client 105 and the wallet server 109 set up and validate the cryptographic ticket scheme based on secret information stored within the secure element 106. The wallet client 105 making the request for session establishment can be identified based on the cryptographic ticket scheme and the wallet identifier.

In one example embodiment, the wallet client 105 generates and sends the nonces to the SP system 114 through secured communication channels. For improved security, the session secrets (e.g., the encryption key and the signing key) that are shared between the wallet client 105 and the SP system 114 to encrypt and secure URLs are not sent in any message payloads. In this way, an attacker must defeat network and transport security and observe the first request of the session initialization workflow in order to generate valid session credentials. These secrets are protected by the security of the existing wallet client 105 to wallet server 109 secured communication channel and the VPN (e.g., 115) that exists between the ESB 113 and the SP system 114. This scheme does not require transmission of user-identifying information between the wallet client 105 and the SP system 114, thus reducing the exposure of the mobile device number (MDN) and other user information to a possible network attack.

At step 904, the wallet server 109 validates the request received at step 903 and, if the validation is successful, forwards the request to the SP system 114 over a secure VPN channel, for example, by way of the ESB 113 and the communications network 115. In one example embodiment, the request for a new session transmitted at step 904 includes (1) the wallet identifier corresponding to the wallet client 105; (2) handset information about the mobile device 101 and/or its components (e.g., a handset identifier, such as an international mobile station equipment identity (IMEI), a mobile equipment identifier (MEID), and/or a media access control (MAC) address); (3) a mobile device number corresponding to the mobile device 101; (4) the nonces generated at step 902; and/or (5) a wallet server timestamp generated by the wallet server 109.

In one example embodiment, the wallet identifier, mobile device number, and handset information included in the request transmitted by the wallet server 109 at step 904 enable the service provider corresponding to the SP system 114 to map a particular consumer to their SP account(s). The wallet server time stamp allows for policy compliant session timeout and similar workflows. The following is an exemplary structure of the request transmitted by the wallet server 109 at step 904:

---
Message := <Nonce (encrypting key)> || <Nonce (signing key)> || <Wallet ID> || <MDN> || <IMEI/MEID> || <CIN> || <optional PRN> || <Time stamp>
---

At step 905, the SP system 114 executes one or more functions for establishing a session, based on the information received in the request at step 904. For instance, the SP system 114 may (1) determine which SP services are available based on the wallet identifier received from the wallet server 109 at step 904, (2) determine whether any sessions are already established for the wallet identifier, (3) set a session duration or window, and/or (4) derive keys from the nonces received at step 904.

In one example embodiment, the SP system 114 computes a signing key based on nonce A and computes an encryption key based on nonce B. As will be described below in the context of step 908, the wallet client 105 also computes the signing key and the encryption key, in the same manner as the SP system 114. By using the same key derivation procedure, the SP system 114 and the wallet client 105 create interoperable encryption and signing keys. The encryption key and the signing key are used to protect the privacy and integrity of data communicated throughout the duration of the session. In one example embodiment, the SP system 114 generates the encryption key and the signing key by executing a key derivation function known as password-based key derivation function 2 (PBKDF2), using the nonces as input. The following is an example segment of pseudocode that the SP system 114 may employ to generate the encryption key and/or the signing key based on the nonces.

---
AES-256(key) := PBKDF2(HMAC-SHA-256, input, c=10000, dK=256b)
HMAC-SHA-256(key) := PBKDF2(HMAC-SHA-256, input, c=10000, dK=256b)
Input:= <split the nonce into two equal halves, passing the first half as 'salt' and the second half as 'password' to PBKDF2
---

In one example embodiment, for improved security, the wallet client 105 and the SP system 114 are not permitted to use a single key (e.g., from a single nonce) for the purpose of both signing and encryption. Instead, the SP system 114 uses one nonce to generate the signing key and another nonce to generate the encryption key.

At step 906, the SP system 114 transmits a session result response to the wallet server 109 by way of the communication network 115 (and optionally the ESB 113). In one example embodiment, the session result response does not include any end-user information, device information, or service provider-specific information. Because the SP system 114 and the wallet client 105 compute the encryption key and the signing key in a distributed manner (i.e., separately), neither the encryption key nor the signing key is transmitted between the SP system 114 and the wallet client 105, thus reducing exposure to the sensitive encryption key and signing key. In another example embodiment herein, an identifier from the SP system 114 is included in the session result response to enable the encrypted and/or signed URL invocation to be matched to the particular wallet client 105 that invoked the URL.

In one example embodiment, SP system 114 forms the session result response according to a predetermined structure that, if the session result response indicates that the session is successfully established, includes a data element created based on a shared static value encrypted and signed by the derived encryption key and signing key, respectively. This enables the wallet client 105 to verify that the distributed encryption and signing key computation, cipher selection, and configuration occurred properly. The following is an example structure of the session result response:

Message := <Response Code Structure>||Signed/Encrypted<Value =0x1122334455667788>

The wallet server 109, at step 907, transmits the session result response to the wallet client 105, and the wallet client 105 executes, at step 908, one or more functions for establishing a session, based on the information received in the session result response at step 907. For instance, the wallet client 105 may (1) check the session result response code and/or derive a signing key and an encryption key based on the nonces generated at step 902. In one example embodiment herein, the wallet client 105 computes a signing key based on nonce A and computes an encryption key based on nonce B, in a manner similar to that described above in connection with step 905.

In one example, if the SP system 114 is not available to fulfill the session establishment requested at step 903 and/or returns an error in the session result response, the wallet client 105 indicates to the user that the requested payment product function (e.g., in connection with a request to implement a function such as the functions/use cases described above in the context of FIG. 8) is unavailable and does not invoke the URL of the SP system 114.

In accordance with another example embodiment herein, the wallet client 105 invalidates the session keys (i.e., the encryption key and the signing key) when the user is no longer authenticated or PINed into the wallet client 105. For example, the wallet client 105 may become automatically locked after the session has been established for a predetermined time duration (e.g., thirty minutes), regardless of user activity. In this case, the SP system 114 may maintain the duration of the session keys for a period no longer than the predetermined time duration after which the wallet client 105 becomes locked.

In another example embodiment, the SP system 114 invalidates the session keys and establishes a new session when the wallet client 105, the wallet server 109, and/or the ESB 113 initiate a new session request.

3. SP Servicing Environment Invocation by Wallet Client

Figure 10:
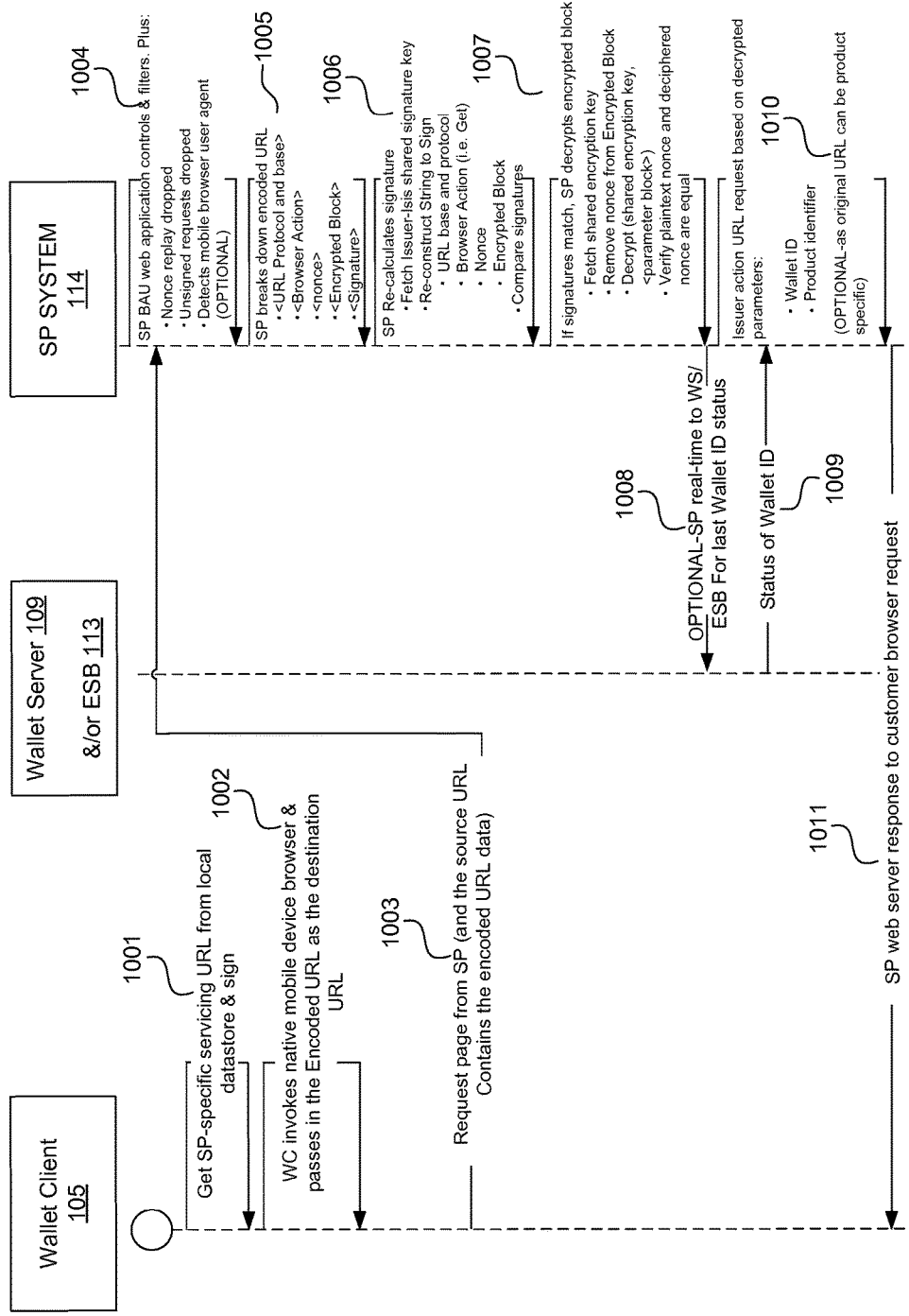
FIG. 10 shows an exemplary procedure for invoking an SP servicing environment by a wallet client, in accordance with an example embodiment herein.

Reference will now be made to FIG. 10 to describe an exemplary procedure for invoking a SP servicing environment by the wallet client 105, for example, after a session has been established in the manner described above in connection with FIG. 9.

In one example embodiment, in order to invoke the SP servicing environment, the wallet client 105 employs only a single identifier (i.e., the wallet identifier) and the URL encryption/signing scheme described above in the context of FIG. 9. For requests for to implement functions, other than adding a payment product, that involve a particular payment account, the wallet client 105 also uses an additional identifier, a payment product reference number (PRN), which uniquely identifies a particular payment product. In this manner, service providers are provided with robust protection during interactions over network topologies that incorporate third party systems.

After the SP system 114 and the wallet client 105 have agreed upon session secrets (e.g., the encryption key and the signing key described above in connection with FIG. 9), the wallet client 105 can successfully launch functions to be serviced by the SP system 114 (e.g., the payment product function(s) described above in the context of FIG. 8). For purposes of convenience, the procedure 1100 will be described in the context of a request to access the SP mobile website 116, although this should not be construed as limiting. Requests to execute payment product functions other than accessing the SP mobile website 116 (e.g., any of the payment product functions described above in the context of FIG. 8) are also contemplated and are within the scope of the example embodiments herein.

In one example embodiment, prior to step 1001, the wallet client 105 is in an authenticated state (e.g., by having executed one of the authentication procedures described above), and a secure communication channel has been established between the wallet server 109 and the SP system 114.

At step 1001, in response to a user requesting to launch the SP mobile website 116 (e.g., by selecting a button via the mobile device 101), the wallet client 105 retrieves an SP servicing environment request base URL from the wallet client database 108 and validates the integrity of the base URL against a URL signature also stored in the wallet client database 108. The wallet client 105 generates an SP servicing environment request URL using a request action (e.g., a unique identifier that can be used to generate a deep link into one or more specific functions in the SP servicing environment) and the wallet identifier, and encrypts any sensitive values in the URL. The wallet client 105 then signs the SP servicing environment request URL to enable the wallet server 109, the ESB 113, and/or the SP system 114 to detect any tampering of the URL that may occur in transit.

In one example embodiment, the service provider supports the SP servicing environment by providing commands, in the form of URLs, for executing SP functions (e.g., presenting payment product details, adding a payment product to the wallet client 105, etc.) into the wallet server 109 via the controlled secure interface, the wallet administration tool 112 (FIG. 1) described above. The wallet server 109 pushes these command URLs to the wallet client database 108 as part of the secured procedure for synchronizing/updating the wallet client 105 and the wallet server 109.

The following is an exemplary format of the SP servicing environment request URL:

```
URL := <protocol> <url base> '/' <action> <parameter
  block>
where:
        protocol := 'https'
        url base :=
        'https://www.ic_issuer.com/isis/android/'
        action := 'card_details'
        parameter block := ?<parameter>+
        parameter := <name>=<value> |
        <parameter>&<parameter>
        name | value := <text>
```

In one example embodiment, the wallet client 105 constructs the request URL by executing a request construction algorithm including the following steps:
(1) Formatting the request as a URL template (such as, for example, a parameterized SQL query), complete with parameter delimiters;
(2) Encoding URL parameters;
(3) Verifying each parameter used at most once;
(4) Placing parameters in a predetermined order (e.g., wallet identifier and an optional PRN);
(5) Prepending a request-specific nonce to the parameter block;
(6) Encrypting the parameter block, including the nonce;
(7) Replacing the parameter block with the nonce and cipher text;
(8) Signing the entire request; and
(9) Appending a signature to the request.

The above request construction algorithm produces, in one example, a message having the following format:

```
URL := <protocol> <url base> '/' <action> <protected block>
protected block := <signed params> ':' <signature>
signed params := <nonce> ':' <encrypted block>
nonce := '?nonce=' <PRNG> '&'
PRNG := Cryptographically-strong PRNG: 32B output
encrypted block := <nonce> ENC(<parameter block>)
ENC := AES-256(ISR-WC-SHARED-SECRET-KEY1, <parameter
  block>
parameter block := <nonce> 'walletID='<value> [<parameter>+]
parameter := '&'<name>=<value> | <parameter>+
name | value := <text>
signature := HMAC-SHA2-256(ISR-WC-SHARED-KEY2, <signed>)
signed := <protocol> <url base> '/' <action> <signed params>
```

In one example embodiment, the URL is constructed by using two keys—an encryption key and a signing key, which, in one example, are generated as described above in connection with step 905 (FIG. 9) and/or the SSO authentication procedure.

In one example embodiment, if multiple interactions with the SP system 114 are required after the initial SP servicing environment is invoked, the wallet client 105 continues to construct and sign SP servicing environment request URLs using the agreed-upon encryption and signing keys until either the wallet client 105 or the SP system 114 invalidates the session. When the session terminates, the sequence of operations restarts with the establishment of a new session with the SP system 114, for example, in the manner described above in connection with FIG. 9.

At step 1002, the wallet client 105 invokes the mobile device web browser 103 and passes the encoded URL as the destination URL.

At step 1003, the wallet client 105 transmits to the SP system 114 a request to launch the SP mobile website 116. In one example embodiment, the request includes a source URL including data of the encoded URL generated at step 1001.

In some example embodiments, the wallet client 105 encrypts an entire parameter block of the request transmitted at step 1003. Thus, based on the plaintext of the request alone, the SP system 114 is unable to match the particular wallet client 105 to the encryption key and the signing key. The SP system 114, therefore, stores and maintains mapping information that maps each session initiated by a particular wallet client 105 to corresponding encryption and signing keys.

At step 1004, the SP system 114 executes one or more web application controls and/or filters. In addition, the SP system 114 drops the nonce reply and the unsigned requests from the request received at step 1003. In one example embodiment, the SP system 114 detects a type of user agent implemented by the mobile web browser 103.

At step 1005, the SP system 114 breaks down the encoded URL received as part of the request at step 1003. For instance, the SP system 114 may break down the encoded URL by separating the URL into (1) a URL protocol and base, (2) a browser action, (3) a nonce, (4) an encrypted block, and/or (5) a signature.

At step 1006, the SP system 114 verifies the signature with which the wallet client 105 signed the URL at step 1001. In one example embodiment, the SP system 114 verifies the signature by (1) detaching the signature from the request, (2) re-computing and verifying that the re-computed signature matches the detached signature, (3) removing the nonce from the encrypted parameter block, (4) decrypting the parameter block, (5) verifying the detached nonce with a first parameter in decrypted plaintext, (6) verifying that no more than one instance of each parameter exists, (7) if necessary, decoding parameters and re-encoding them for a target, and (8) dispatching the request. The SP system 114 compares the signature received as part of the request at step 1003 with the signature generated at step 1006 to determine whether they match.

At step 1007, if the SP system 114 determines that the signature received as part of the request at step 1003 matches the signature generated at step 1006, then the SP system 114 decrypts the encrypted block, for example, by (1) fetching an encryption key, (2) removing a nonce from the encryption block, (3) decrypting the parameter block (e.g., including parameters such as a wallet identifier and/or a payment product identifier) by using the encryption key, and (4) verifying that the plaintext nonce matches the deciphered nonce.

At optional step 1008, the SP system 114 transmits to the wallet server 109 and/or the ESB 113 a request for a status of a wallet identified included in the parameter block decrypted at step 1007. The wallet server 109 and/or the ESB 113 retrieve a status of the wallet identifier from the wallet database 110 and, at step 1009, transmit the status of the wallet identifier to the SP system 114.

At step 1010, the SP system 114 acts upon the URL request based on the parameters (e.g., the wallet identifier and/or a payment product identifier) decrypted at step 1007. At step 1011, the SP system 114 transmits to the wallet client 105 a web server response by way of the wallet server 109 and/or the ESB 113.

In one example embodiment, if the SP system 114 fails to resolve the URL or the SP system 114 is unavailable, the mobile web browser 103 presents to the user an HTTP error message and/or a platform-dependent message if the URL does not launch.

In one example embodiment, if the SP system 114 fails to verify the signature at step 1006, or determines, after decoding the message, that the message includes multiple instances of the same parameter, or that parameters include illegal and/or suspicious characters, then it is assumed that the message has been tampered with. In this case, the SP system 114 executes an alternative error handling procedure and provides an error message to the user within the mobile website 116 and/or the mobile application 107.

4. Callback to Wallet Client

The SP system 114, after completing an authenticated servicing request, invokes a callback procedure to provide the wallet client 105 with a result of the servicing request, such as, for instance, success or failure.

In one example embodiment, the callback procedure described herein is similar to the procedure 1100 (FIG. 10) for invoking the SP servicing environment by the wallet client 105. The callback procedure utilizes the same encryption and signing keys as those used in procedure 1100.

In one example, if the user's authentication with the wallet client 105 has not timed out, then the callback procedure results in the user being returned to the page in the wallet client 105 from which the SP servicing environment was invoked. If the user's authentication has timed out, then the callback procedure causes the mobile device 101 to present the user with a PIN entry page of the wallet client 105, where the user is requested to enter a personal identification number (PIN) in order to obtain access to the wallet client 105.

After the SP system 114 launches the callback procedure, the SP system 114 generates a wallet request URL using a result code, encrypting any sensitive data therein. The SP system 114 signs the generated wallet request URL to enable the wallet client 105, the wallet server 109, and/or the ESB 113 to detect any tampering of the request that may have occurred in transit.

The following is an exemplary format of the wallet request URL:

```
URL := <protocol> <url base> '/' <action> <parameter
  block>
where:
    protocol := 'Isis'
    url base := 'Isis://MobileWallet/'
    action := 'card_details'
    parameter block := ?<parameter>+
    parameter := <name>=<value> |
    <parameter>&<parameter>
    name | value := <text>
```

In one example embodiment, the SP system 114 constructs the wallet request URL by executing a request construction algorithm including the following steps:
(1) Formatting the request as a URL template (such as, for example, a parameterized SQL query), complete with parameter delimiters;
(2) Encoding URL parameters;
(3) Verifying each parameter used at most once;
(4) Placing parameters in a predetermined order (e.g., wallet identifier and an optional PRN);
(5) Prepending a request-specific nonce to the parameter block;
(6) Encrypting the parameter block, including the nonce;
(7) Replacing the parameter block with the nonce and cipher text;
(8) Signing the entire request; and
(9) Appending a signature to the request.

The above request construction algorithm produces, in one example, a message having the following format:

```
URL := <protocol> <url base> '/' <action> <protected block>
protected block := <signed params> ':' <signature>
signed params := <nonce> ':' <encrypted block>
nonce := '?nonce=' <PRNG> '&'
PRNG := Cryptographically-strong PRNG: 32B output
encrypted block := <nonce> ENC (<parameter block>)
ENC := AES-256(ISR-WC-SHARED-SECRET-KEY1, <parameter
block>
parameter block := <nonce> 'walletID='<value> [<parameter>+]
parameter := '&'<name>=<value> | <parameter>+
name | value := <text>
signature := HMAC-SHA2-256(ISR-WC-SHARED-KEY2, <signed>)
signed := <protocol> <url base> '/' <action> <signed params>
```

The wallet client 105 verifies the signature with which the SP system 114 signed the URL. In one example embodiment, the wallet client 105 verifies the signature by (1) detaching the signature from the request, (2) re-computing and verifying that the re-computed signature matches the detached signature, (3) removing the nonce from the encrypted parameter block, (4) decrypting the parameter block, (5) verifying the detached nonce with a first parameter in decrypted plaintext, (6) verifying that no more than one instance of each parameter exists, (7) if necessary, decoding parameters and re-encoding them for a target, and (8) dispatching the request. The wallet client 105 compares the signature received as part of the request with the signature that the wallet client 105 generated to determine whether they match.

If the wallet client 105 fails to verify the signature with which the SP system 114 signed the URL, then the wallet client 105 causes the mobile device 101 to display an error message to the user and to enter an unauthenticated state.

If, when the URL launch is attempted, the URL fails to resolve, then the mobile device 101 presents to the user a platform-dependent error message indicating that the URL failed to resolve. If signature and/or decryption verification fails, the wallet client 105 presents to the user via the mobile device 101 a page requesting that the user enter a PIN.

D. Providing Custom SP Notifications/Information via Wallet Client

An example procedure for providing custom SP notifications and/or information via the wallet client 105 (e.g., on a card details page) will now be described.

1. Custom Notifications Overview

In one example embodiment, the procedure, through the use of a service provider structured data model, enables the SP system 114 to cause custom service provider information (e.g., a custom brief message, interactive menu of offers, and/or the like) to be displayed to a user via the wallet client 105 (e.g., on a card details page). In some example embodiments, the SP system 114 is enabled to present an indicator (such as, for example, a flag on a front of card page of the wallet client 105) that indicates when new content is available on a back of the card page of the wallet client 105. This enables provides service providers to push notifications and/or other communications to their users in a targeted, efficient, integrated, and consistent manner.

A service provider provides a structured data object ("SDO") describing content to be presented via the wallet client 105 for a particular payment product, for an individual account of the wallet client 105. In one example, the content is a JavaScript Object Notation (JSON) document sent to the wallet server 109 and/or the ESB 113, and synchronized with the wallet client 105. In another example, the wallet client 105 requests the content from the SP system 114.

The service provider structured data model is a generic model with a simple description format that enables service provider-specific information to be presented on the card details page(s) of the wallet client 105. In some examples, the service provider-specific information includes one or more interactive elements (e.g., buttons) that enable the user to select an offer. The model renders a variety of content in a consistent manner, while also allowing additional deep links into the SP website 116 and/or the SP mobile application 107 thus enabling the user to execute and/or launch additional more service provider-specific functions from the wallet client 105. In addition, by allowing the SDO to reference additional content by URL, the wallet client 105 and the SP system(s) 114 can communicate directly without having to interact with the wallet server 109 and/or the ESB 113.

Figure 11:
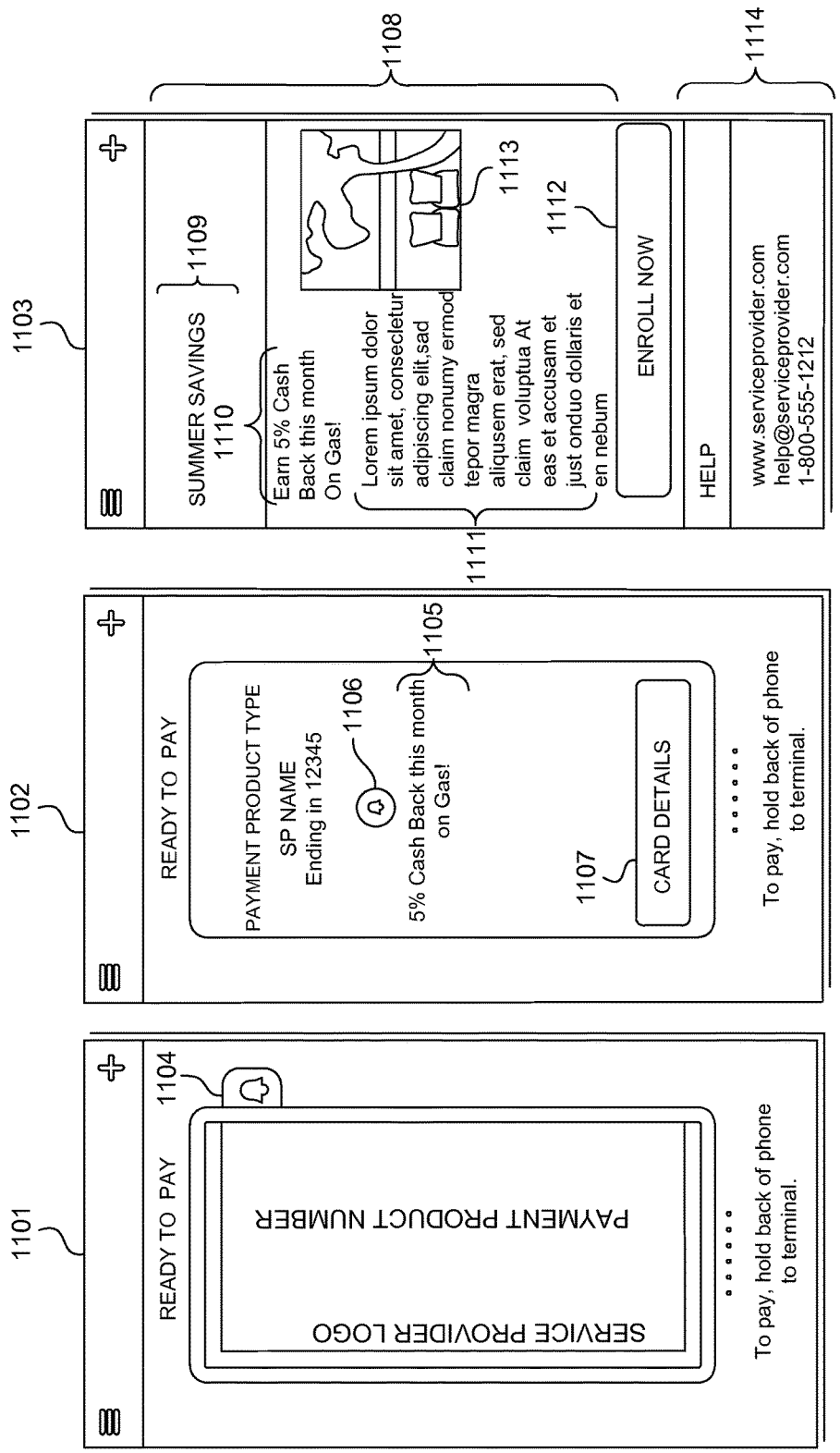
FIG. 11 shows exemplary pages that a wallet client may present, in accordance with various example embodiments herein.

FIG. 11 shows exemplary pages 1101, 1102, and 1103 that the wallet client 105 may present, in accordance with some example embodiments. In particular, the page 1101 is an example of a front of card page, the page 1102 is an example of a back of card page, and the page 1103 is an example of a card details page.

According to one example embodiment, the SDO mentioned above defines a message structure that the service provider may use to present a message via the back of card page 1102, and defines a structure of one or more sections of the card details page 1103 that the service provider may populate with additional information.

For instance, in one example embodiment the SP system 114 may cause a flag 1104 to be presented on the front of card page 1101 in connection with a particular payment product, to indicate that new information is available for that payment product.

The user may select the flag 1104, for example, by touching a portion of a touchscreen of the mobile device 101 where the flag 1104 is located, to cause the mobile device 101 to present the back of card page 1102. The back of card page 1102 displays to the user a short message 1105 (e.g., defined by the SP system 114) such as an offer to enroll in a 5% cash back discount program on gasoline purchases. In some example embodiments, the SP system 114 targets a particular user, a particular wallet client account, and/or a particular payment product to provide a suitable targeted offer.

The user may select an icon 1106 associated with the message 1105 and/or may select a card details button 1107 to cause the mobile device 101 to display the card details page 1103 associated with the message 1105. The card details page displays additional information 1108 regarding the message 1105 based on additional data included in the corresponding SDO. The SP system 114 defines, via the SDO, one or more sections in which to divide the card details page 1103. In the example card details page 1103, the sections include (1) a title section 1109, (2) a heading section 1110, (3) a textual body section 1111, (4) a button section 1112, (5) an image section 1113, and (6) a help section 1116. The SP system 114 defines, in each section, one or more items to be displayed. SP system 114 may select the items from multiple user interface elements (e.g., text, headers, images, icons, buttons, etc.) and may select to arrange the items in one of multiple layout options. This provides service providers with the flexibility to provide to its users custom messages, in formats of its choosing, by way of the wallet client 105.

2. Front of Card/Flag

As described above, if new content is available for a particular user, for a particular payment product, the wallet client 105 displays a flag 1104 adjacent to an image associated with the payment product. In one example embodiment, the wallet client 105 displays the flag 1104 when the payment product comes into the foreground in a rotatable carousel of payment products in the wallet client 105. This indicates to the user that a new message 1105 is available for the user to view by simply launching the back of card page 1102. The message 1105 presented via the back of card page 1102 may prompt the user to select the icon 1106 or the card details button 1107 to cause additional information (e.g., the information provided in sections 1109 through 1116 described above) related to the message 1105 to be displayed via the card details page 1103.

The display of the flag 1104 is controlled by a belgian text property of the SDO. When the belgian text property changes, and is not empty, the flag 1104 is displayed for that card when the payment product is in the foreground. In some example embodiments, the flag 1104 disappears or slides away after a predetermined time period, and reappears any time the carousel slides that payment product into focus. If the user flips to the back of card page 1102 the belgian text property for that payment product is marked as 'seen' and the flag 1104 no longer appears. If the content of the belgian property later changes, the wallet client 105 fetches a new SDO and the belgian property is again marked 'new,' until the user selects the flag 1104 and views the back of card page 1102.

In one example embodiment, whether the flag 1104 is displayed is dependent upon whether the message 1105 on the back of card page 1102 has changed, not whether content (e.g., the information provided in sections 1109 through 1116 described above) on the card details page 1103 has changed. In this way, it is possible to modify the contents of the card details page 1103, without causing the wallet client 105 to display a new flag 1104.

3. Back of Card

The belgian property of the SDO defines a plaintext message 1105 to display on the back of card page 1102 with the icon 1106 (e.g., a bell icon) above it. In some example embodiments, the text of the message 1105 is provided as a simple, unformatted string and, for consistency, the same icon is used for each of the plurality of SP systems 114.

The text of the message 1105 appears on back of card page 1102, unless the belgian property is empty or not defined, or the payment product is in a non-active state, such as a blocked state. For payment products in non-active states such as a blocked state, instead of the text of the message 1105, a payment product status message regarding a card status issue is shown on the back of card page 1102, thus prompting the user to address the card status issue.

4. Card Details

In one example embodiment, the wallet client 105 renders on the card details page 1103 the sections defined in the SDO (e.g., the sections 1109 through 1116 described above) and the items defined in each section, in the order that they appear in the SDO. The wallet client 105 renders the sections and items after rendering any default information. If the sections and items are not included in the SDO, then the wallet client 105 leaves the corresponding sections of card details page 1103 blank. This is the fallback behavior for legacy service providers and/or service providers that do not implement the custom notification function.

5. Interaction

In some example embodiments, the back of card page 1102 and/or the card details page 1103 can present interactive user interface elements, such as, for example, a link or a button that, when selected, launches a website (e.g., the SP mobile website 116) or an application (e.g., the SP mobile application 107) based on an associated URL (e.g., http://www.chase.com/or chase://balance).

In one example, the wallet client 105 attempts to determine whether the mobile device 101 includes an application that is registered to handle the particular URL, which may be for an application or a website. If the wallet client 105 determines that the mobile device 101 does not include any application that is registered to handle the URL, then the wallet client 105 attempts to use an alternative URL, if provided. The following is an example definition of an interactive user interface element, a corresponding URL, and a corresponding alternative URL:

```
type: "button",
url: "chase://isis/balance?token=abc123",
alt_url: http://m.chase.com/go/isis/balance?token=abc123
```

Using the above example, the wallet client 105 determines whether a protocol handler is registered to handle the protocol "chase://" (which, if true, would imply that the mobile device 101 includes an application corresponding to the URL). If the wallet client 105 determines that a protocol handler is registered to handle the protocol "chase://", the wallet client 105 calls the URL. If the wallet client 105 determines that no protocol handler is registered to handle the protocol "chase://", the wallet client 105 calls the alternate URL instead, by invoking the mobile web browser 103. If no alternate URL is provided in connection with the user interface element, then the primary URL is called, regardless of whether it can be handled. In one example, the wallet client 105 launches the application and/or mobile website associated with the URL as a separate instance, not in a context of the wallet client 105.

In accordance with some example embodiments, the interactive user interface elements presented via the back of card page 1102 and/or the card details page 1103 neither contains specific logic, nor dynamically change the user interface. The SP system 114 responds to the selection of the user interface element by providing an update to the SDO for the user (e.g., to show alternate content after the user signs up for a rewards program) based on other external events.

6. Communication

Figure 12:
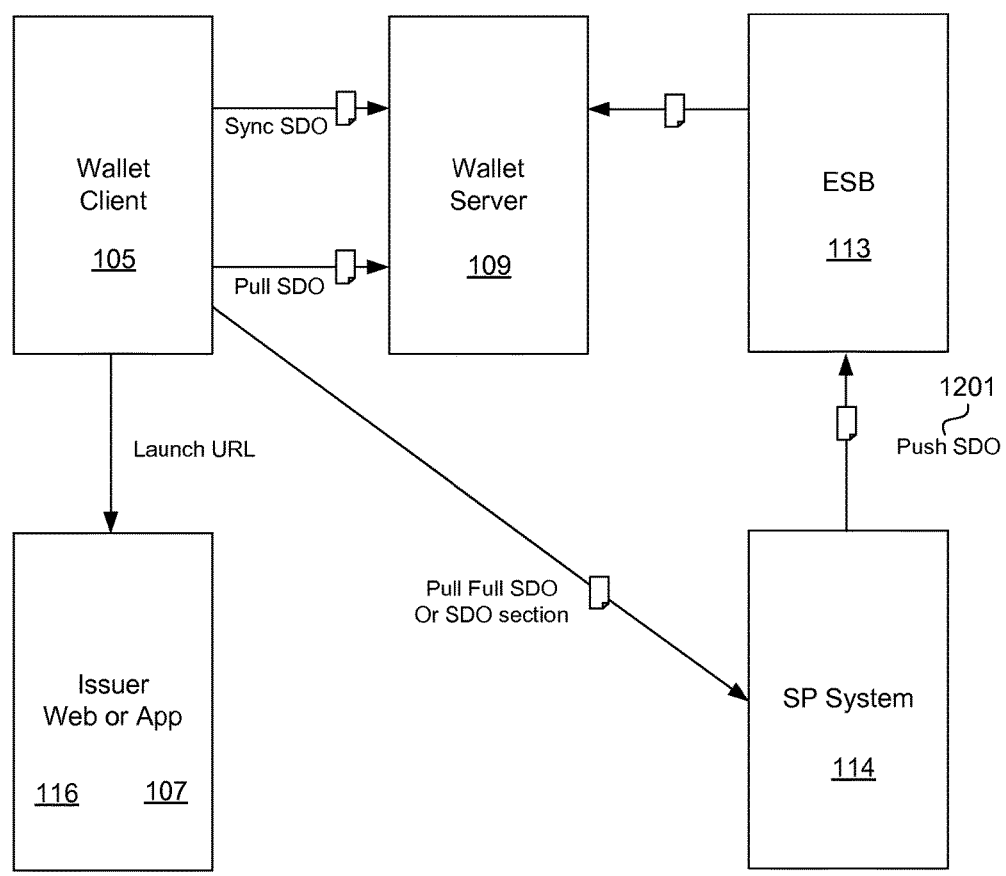
FIG. 12 shows how custom SP notifications and/or information may be provided via a wallet client, in accordance with an example embodiment herein.

FIG. 12 illustrates how certain components of the system 200 (FIG. 2) may communicate to provide custom SP notifications and/or information via the wallet client 105, in accordance with various example embodiments herein.

a. SP to Wallet Client

At step 1201, the SP system 114 pushes an SDO document to the wallet server 109 by way of the communication network 115 (not shown in FIG. 12) and the ESB. The SDO document is provided to the wallet client 105, for example, via the mobile network 111 (not shown in FIG. 12) as part of a periodic synchronization procedure that synchronizes the states of the wallet server 109 and the wallet client 105. Along with the SDO document, the SP system 114 provides (step 1201) a wallet identifier and a card identifier corresponding to the particular wallet client 105. To provide the wallet client 105 with updated content, the SP system 114 can push a new SDO document to the wallet server 109 by way of the ESB 113. The wallet server 109 provides the updated content to the wallet client 105 during the synchronization procedure described above.

b. SP to ESB/Wallet Server

In one example embodiment, the SP system 114 send an SDO to multiple users by providing to the wallet server 109 (e.g., by way of the ESB 113) multiple wallet identifiers with the SDO document. In another example embodiment, the SP system 114 provides the wallet server 109 with only a particular type of payment product (e.g., "Chase Freedom"), which causes the wallet server 109 to synchronize the SDO document with all of the wallet clients 105 having that particular payment product.

c. Wallet Server to Wallet Client

As described above, the SDO document is provided to the wallet clients 105 through the periodic synchronization process between the wallet server 109 and the wallet clients 105. In some example embodiments, the wallet server 109 provides an additional API to synchronize only the SDO, so that interactions with the content in the user interface can trigger additional requests from the wallet client 105 to pull the wallet server 109 for possible updates. For example, scenarios where the wallet client 105 pulls additional updates from the wallet server 109 include:

(1) Flipping to the back of card page 1102,
(2) Viewing the card details page 1103,
(3) Selecting the button 1112 on the card details page 1103, and
(4) Returning the wallet client 105 to the foreground when on card details page 1103.

7. SDO Document Format

In some example embodiments, during the onboarding process described above, a service provider can provide a default document for all users (e.g., an SDO including contact information of all payment products associated with the service provider). In another example, the service provider can provide a default document for all users of a particular payment product associated with the service provider (e.g., an SDO including card features to all users of a particular payment product offered by the service provider).

The SDO is defined in the JSON format and is validated by the wallet server 109 and the wallet client 105. The SP systems 114 provide JSON-formatted SDO objects on a per-product and/or a per-user basis, for example, via the wallet administration tool 112. Thus, the SP systems 114 can provide content specific to a user and/or a product.

If the SP system 114 uses URLs, whether as links to a website or an application, or as a reference for the wallet client 105 to fetch further structured data, the SP system 114 can pass context including a user identifier and/or a product identifier in the URL.

In one example embodiment, when an SDO document is updated, the updated SDO document replaces the entire previous SDO document on the wallet server 109 and the wallet client 105.

The SDO document defines data and behavior for a particular payment product. The protocol for receiving updates from the SP system 114 to the ESB 113, and between the wallet server 109 and the wallet client 105, includes a wallet identifier and a payment product identifier enable to the association of the SDO document with a particular wallet client 105 and payment product.

The root SDO, in some example aspects, is a JSON object, and any additional content fetched by the wallet client 105 to augment the data in the root SDO takes the same JSON format. The wallet server 109 and/or the wallet client 105 validate the JSON-formatted SDO document, and the document is not rendered if the document is determined to be not valid. If only an individual section or item of the SDO document is determined to be invalid, only that section or item is not rendered.

a. URL References/Root Document Elements

Table 5 below shows elements of the root SDO document.

TABLE 5

| Property name | Type | Required/ Optional | Default value | Format tags allowed | Max Length | Notes |
|---|---|---|---|---|---|---|
| belgian | String | Optional | | No | 80 | |
| version | Integer | Required | | No | | version 1 |
| timestamp | Time | Required | | No | | Seconds since Unix epoch |
| url | URL | Optional | | No | | |
| cache | Boolean | Optional | true | No | | |
| sections | Array | Optional | | No | 6 | Array of section objects |

The root SDO document, as well as individual sections of the SDO document can define a URL property (as shown in Table 5 below) that refers to another location for additional data. The service provider defines the URL property, and, when the URL is launched, the wallet client 105 fetches additional JSON content for the SDO. The wallet client 105 caches the content of any response, and this can be disabled by setting the cache property (shown in Table 5 below) to false.

The belgian property in Table 5 defines text of the message 1105 that appears on the back of card page 1102 and indicates to the wallet client 105 when a flag 1104 should appear on the front of card page 1101. When the value for the belgian property changes from one SDO to the next, the flag 1104 will be displayed on the front of card page 1101 to indicate that new information is available on the back of card page 1102. By changing the contents of the belgian property, the service provider can cause the wallet client 105 to notify the user that something on the card details page 1103 has changed.

In some example embodiments, the 'version' property in Table 5 is required, and represents a version of the SDO document format. This provides backward compatibility, in that legacy service providers can ignore properties they are unaware of and/or do not support, and only process properties that they do support.

The 'timestamp' property in Table 5 represents the time the SDO document was last updated in seconds since the UNIX epoch.

The 'url' property in Table 5, if provided, represents a location for fetching an additional JSON SDO document, and is used to define all properties of the SDO document—other than the timestamp property, the URL property, and the cache property. Formatting requirements are the same as the default SDO. If the URL fails to load or parse, any values defined in the document are rendered using default values. The default values for the timestamp property, the url property, and the cache property in the initial SDO are not overridden by the additional SDO fetched using the URL property. In some example embodiments, valid values for a URL are checked against a whitelist of permitted URLs, and URLs that do not match the whitelist are invalid and ignored.

The cache property in Table 5 controls the caching of the content fetched by the URL property. If the cache property is set to false, any data fetched by the URL property is not cached on the wallet client 105 and is fetched each time for display on the back of card page 1102 and the card details page 1103. An inline spinner should be rendered on the back of card page 1102 and the card details page 1103 while content is being fetched. If the cache property is set to true, the document can be cached to the device, and those values are displayed immediately, but any rendering triggers the wallet client 105 to check the URL again for an updated version. If an updated version is available, the wallet client 105 immediately renders any contents that were modified during the update.

The sections property in Table 5 is an array of section objects. Each of the section objects is either an array of items or a URL location from which to fetch the array of items. The section objects are rendered in order. In one example aspect, the URL property of the root node can be used to define all sections externally. If undefined, no sections are rendered on the card details page 1103, and the back of card message 1105 and flag 1104 operate in the manner described above. That is, selecting the icon 1106 or the button 1107 on back of card page causes the wallet client 105 to launch the card details page 1103.

b. Sections

Table 6 shows example properties that may be included in each of the section objects described above in connection with Table 5. The section objects are required to render any user interface elements on the card details page 1103. Each section object appears on the card details page 1103 in the order represented in the SDO document. Some sections include an item that is displayed in the corresponding section on the card details page 1103.

TABLE 6

| Property name | Type | Required/ Optional | Default value | Format tags allowed | Max Length | Notes |
|---|---|---|---|---|---|---|
| Label | String | Required | | No | 40 | |
| Items | Array | Required | | No | 12 | Array of item objects |
| Cache | Boolean | Optional | true | No | | |

The label property in Table 6 is the text label to apply for that section. In some example aspects herein, no formatting of the label property is permitted and the value of the label property must be non-empty.

The items property in Table 6 is an array of item objects (described below), which are rendered in the order defined in the SDO document. If the items property is a URL rather than an array, the URL is fetched and a JSON array of the items is displayed. If there are no items defined in the section object, then no section header is rendered. The service provider can construct the URL to call any customer specific item data desired.

The cache property in Table 6 enables the service provider to control whether the URL for the items collection is locally cached (e.g., by the wallet client 105). If the cache property is set to false, then the URL is not cached in the wallet client 105 and is dynamically fetched each time the card details page 1103 is rendered. An inline spinner is rendered for each section while its content is being fetched. If the cache property is set to true, then the data is cached by the wallet client 105, the contents are rendered immediately, and the URL is checked for updated content each time the card details page 1103 is rendered.

c. Items

The item objects of the item property in Table 6 are individual user interface elements rendered in a section. In one example embodiment, there are four item types: (1) text, (2) button, (3) link, and (4) block, although this example should not be construed as limiting. Additional item types are contemplated and are within the scope of the example embodiments herein. Each item type has a corresponding set of valid properties. For instance, a headline property may only be valid for a block item type. In one example embodiment, each item object displays the full width of the card details page 1103 and the item objects are rendered in the order defined for the corresponding section. There are no visual dividers between user interface elements, thus multiple items can be rendered in sequence for a visual group.

i. item type=text

Table 7 shows an example item object of the text item type. A block of text is displayed when the item type is set to the text item type. In some example aspects herein, the SP system 114 can optionally format the block of text, but cannot include embedded links.

TABLE 7

| Property name | Type | Required/ Optional | Default value | Format tags allowed | Max Length |
|---|---|---|---|---|---|
| Text | String | Required | | Yes | 320 |

The text property in Table 7 renders lines of text in a default color, wrapping as necessary. In one example embodiment, the text property can include one or more formatting tags (described below), and does not contain embedded links.

ii. item type=button

Table 8 shows an example item object of the button item type, which causes a button to be displayed. The button can optionally trigger a URL link when selected by a user.

TABLE 8

| Property name | Type | Required/ Optional | Default value | Format tags allowed | Max Length |
|---|---|---|---|---|---|
| text | String | Required | | No | 30 |
| url | URL | Required | | No | |
| alt_url | URL | Optional | | No | |

The text property in Table 8 represents is the label that is displayed for the button. In some embodiments, the text is formatting tags are not permitted for the text property.

The URL property in Table 8 represents the URL to be launched when the button is selected. In some embodiments, a corresponding application or webpage is launched as a new application instance, not rendered framed in a context of the wallet client 105. Other applications can call a callback URL to bring the wallet client 105 back to the foreground.

The alt_url property in Table 8 is optional and, if provided, is called when the wallet client 105 determines that there is no registered protocol handler available for the URL property.

iii. item type=link

Table 9 shows an example item object of the link item type, which causes text of a link to be displayed in an alternative color. When the link is selected, a corresponding URL is launched.

TABLE 9

| Property name | Type | Required/ Optional | Default Value | Format tags allowed | Max Length |
|---|---|---|---|---|---|
| text | String | Required | | Yes | 240 |
| label | String | Optional | | Yes | 30 |
| url | URL | Required | | No | |
| alt_url | URL | Optional | | No | |

The text property in Table 9 represents a block of text to be rendered in an alternative color, wrapping as necessary. The text property can include one or more formatting tags (defined below). If a URL is provided in connection with the link, then, when the text is selected, the URL is launched in web browser 103 or application 107.

The label property in Table 9 represents a short text label to be rendered to the left of the actual link text.

The URL property in Table 9 represents the URL to be launched when the link is selected, in a similar manner as that described above for the button item.

The alt_url property in Table 9 represents an alternative URL to be launched in a similar manner as that described above for the button item.

iv. item type=block

Table 10 shows an example item object of the block item type, which is includes optional properties that can be used to render items in different ways. All of the elements of the block item type elements are optional.

TABLE 10

| Property name | Type | Required/ Optional | Default value | Format tags allowed | Max Length | Notes |
|---|---|---|---|---|---|---|
| headline | String | Optional | | Yes | 30 | |
| text | String | Optional | | Yes | 240 | |
| image | URL | Optional | | No | | URL to img. 360 × 360 px square. |
| align | "left" "right" "center" | Optional | "left" | No | | |

The headline property in Table 10 represents a line of text to be displayed at a font size larger than normal text. The headline property can include formatting tags (described below).

The text property in Table 10, which can also include light formatting tags, defined below, represents a block of text to be displayed, wrapping as necessary.

The image property in Table 10 represents a URL to an image to be rendered. The image, in some examples, is square (e.g., 360×360 pixels in a portable network graphics (PNG) format). The image can be rendered one-to-one on an "xxhdpi" (1080 p) device, or can scaled appropriately on smaller devices. The image follows the same caching rules as those that apply to the section in which it is defined.

The align property in Table 10 represents a position of the image. If the align property is set to right or left, then the image is aligned with the right or left side of the screen, respectively, and any headline and/or text content is constrained to the other side, creating a two column layout. If the align property is set to center, then the image is positioned with matching right and left margins, and any headline and/or text entry is positioned below the image.

d. Text Formatting

As described above, certain text elements for some items can include formatting. In one example embodiment, formatting is embedded in the string itself through the use of tags. The <and> tokens define the tags. If a tag is not matched, or is missing its closing tag, it is rendered literally. Tags cannot be nested or overlap. If tags are nested or overlap, then formatting is ignored. In some embodiments, the following exemplary tags are supported:

```
<br /> (line break)
<b> </b> (bold)
<i> </i> (italic)
<h> </h> (highlight color)
```

Figure 13:
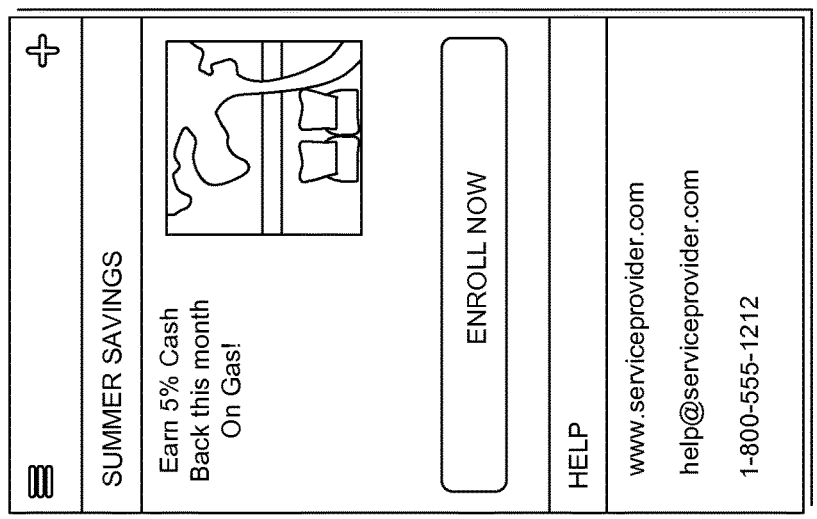
FIG. 13 shows how an example structured data object document can be rendered, in accordance with an example embodiment herein.

FIG. 13 shows an example of how the following example SDO document can be rendered.

```
{
  belgian: "5% Cash Back this month on Gas!",
  timestamp: 1357341010,
  version: 1,
```

```
  sections: [
    {   label: "Summer Savings",
        items: [
          {   type: "block",
              headline: "Earn 5% Cash Back this month on Gas!",
              image: "http://www.amex.com/go/card.png",
              align: "right",
              text: "Lorem ipsum dolor sit amet, consetetur sadipscing ..." },
          {   type: "button", text: "Enroll Now",
              url: "http://www.amex.com/go/enroll",
          }
        ]
    }
    {   label: "Help",
        items: [
          {   type: "link",
              text: "www.americanexpress.com",
              url: "http://www.americanexpress.com/" },
          {   type: "link",
              text: "help@americanexpress.com",
              url: "mailto:help@americanexpress.com" },
          {   type: "link",
              text: "1-800-555-1112",
              url: "tel:18005551112" }
        ]
    }
  ]
}
```

Figure 14:
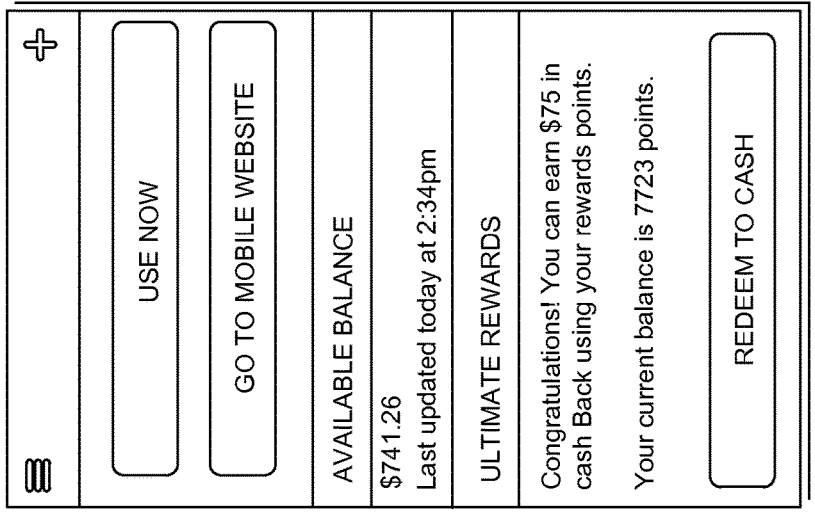
FIG. 14 shows how another example structured data object document can be rendered, in accordance with an example embodiment herein.

FIG. 14 shows an example of the rendering of the following example SDO document.

```
{
  belgian: "You've earned 600 more reward points.",
  timestamp: 1357344321,
  version: 1,
  sections: [
    { label: "Available Balance",
      items: "http://api.chase.com/isis/bal?id=abc"
    }
    { label: "Ultimate Rewards",
      items: "http://api.chase.com/isis/rew?id=abc"
    }
  ]
} http://api.chase.com/isis/bal?id=abc :
[
  { type: "block",
    headline: "$741.26",
    text: "Last updated today at 2:34pm" }
]
http://api.chase.com/isis/rew?id=abc :
[
  { type: "text",
    text: "Congratulations! <b>You can earn $75 in Cash Back</b> using your reward points. <br /> Your current balance is <b>7723 points</b>." },
  { type: "button",
    text: "Redeem to Cash",
    url: "chase://isis/rewards?id=chs123",
    alt_url: "http://m.chase.com/isis/r?i=chs"
  }
]
```

IV. Example Computer-readable Medium Implementations

The example embodiments described above, such as, for example, the systems and procedures depicted in or discussed in connection with FIGS. 1 through 14 or any part or function thereof, may be implemented by using hardware, software or a combination of the two. The implementation may be in one or more computers or other processing systems. While manipulations performed by these example embodiments may have been referred to in terms commonly associated with mental operations performed by a human operator, no human operator is needed to perform any of the operations described herein. In other words, the operations may be completely implemented with machine operations. Useful machines for performing the operation of the example embodiments presented herein include general-purpose digital computers or similar devices.

Figure 15:
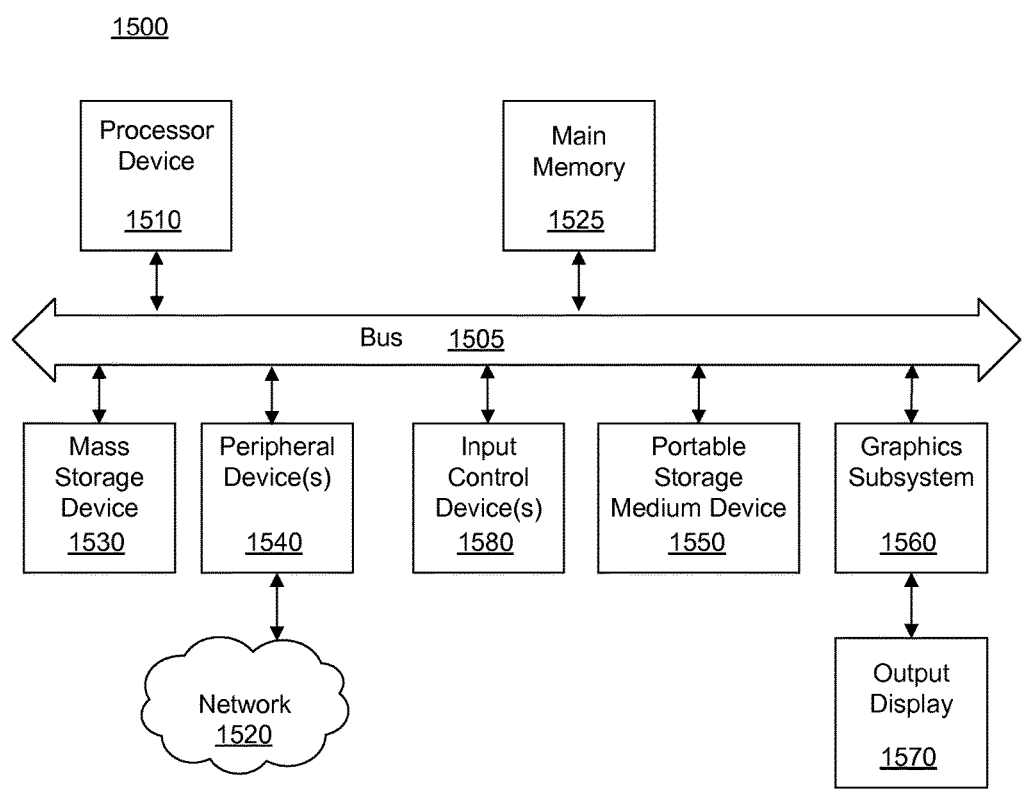
FIG. 15 is a block diagram of a general and/or special purpose computer that may be employed in accordance with various example embodiments herein.

FIG. 15 is a block diagram of a general and/or special purpose computer 1500 that may be employed in accordance with various example embodiments herein. The computer 1500 may be, for example, a user device, a user computer, a client computer, and/or a server computer, among other things.

The computer 1500 may include without limitation a processor device 1510, a main memory 1525, and an interconnect bus 1505. The processor device 1510 may include without limitation a single microprocessor, or may include a plurality of microprocessors for configuring the computer 1500 as a multi-processor system. The main memory 1525 stores, among other things, instructions and/or data for execution by the processor device 1510. The main memory 1525 may include banks of dynamic random access memory (DRAM), as well as cache memory.

The computer 1500 may further include a mass storage device 1530, peripheral device(s) 1540, portable storage medium device(s) 1550, input control device(s) 1580, a graphics subsystem 1560, and/or an output display 1570. For explanatory purposes, all components in the computer 1500 are shown in FIG. 15 as being coupled via the bus 1505. However, the computer 1500 is not so limited. Devices of the computer 1500 may be coupled via one or more data transport means. For example, the processor device 1510 and/or the main memory 1525 may be coupled via a local microprocessor bus. The mass storage device 1530, peripheral device(s) 1540, portable storage medium device(s) 1550, and/or graphics subsystem 1560 may be coupled via one or more input/output (I/O) buses. The mass storage device 1530 may be a nonvolatile storage device for storing data and/or instructions for use by the processor device 1510. The mass storage device 1530 may be implemented, for example, with a magnetic disk drive or an optical disk drive. In a software embodiment, the mass storage device 1530 is configured for loading contents of the mass storage device 1530 into the main memory 1525.

The portable storage medium device 1550 operates in conjunction with a nonvolatile portable storage medium, such as, for example, a compact disc read only memory (CD-ROM), to input and output data and code to and from the computer 1500. In some embodiments, the software for storing an internal identifier in metadata may be stored on a portable storage medium, and may be inputted into the computer 1500 via the portable storage medium device 1550. The peripheral device(s) 1540 may include any type of computer support device, such as, for example, an input/output (I/O) interface configured to add additional functionality to the computer 1500. For example, the peripheral device(s) 1540 may include a network interface card for interfacing the computer 1500 with a network 1520.

The input control device(s) 1580 provide a portion of the user interface for a user of the computer 1500. The input control device(s) 1580 may include a keypad and/or a cursor control device. The keypad may be configured for inputting alphanumeric characters and/or other key information. The cursor control device may include, for example, a mouse, a trackball, a stylus, and/or cursor direction keys. In order to display textual and graphical information, the computer 1500 may include the graphics subsystem 1560 and the output display 1570. The output display 1570 may include a cathode ray tube (CRT) display and/or a liquid crystal display (LCD). The graphics subsystem 1560 receives textual and graphical information, and processes the information for output to the output display 1570.

Each component of the computer 1500 may represent a broad category of a computer component of a general and/or special purpose computer. Components of the computer 1500 are not limited to the specific implementations provided here.

Portions of the example embodiments of the invention may be conveniently implemented by using a conventional general-purpose computer, a specialized digital computer and/or a microprocessor programmed according to the teachings of the present disclosure, as is apparent to those skilled in the computer art. Appropriate software coding may readily be prepared by skilled programmers based on the teachings of the present disclosure.

Some embodiments may also be implemented by the preparation of application-specific integrated circuits, field programmable gate arrays, or by interconnecting an appropriate network of conventional component circuits.

Some embodiments include a computer program product. The computer program product may be a storage medium or media having instructions stored thereon or therein which can be used to control, or cause, a computer to perform any of the procedures of the example embodiments of the invention. The storage medium may include without limitation a floppy disk, a mini disk, an optical disc, a Blu-Ray Disc, a DVD, a CD-ROM, a micro-drive, a magneto-optical disk, a ROM, a RAM, an EPROM, an EEPROM, a DRAM, a VRAM, a flash memory, a flash card, a magnetic card, an optical card, nanosystems, a molecular memory integrated circuit, a RAID, remote data storage/archive/warehousing, and/or any other type of device suitable for storing instructions and/or data.

Stored on any one of the computer readable medium or media, some implementations include software for controlling both the hardware of the general and/or special computer or microprocessor, and for enabling the computer or microprocessor to interact with a human user or other mechanism utilizing the results of the example embodiments of the invention. Such software may include without limitation device drivers, operating systems, and user applications. Ultimately, such computer readable media further includes software for performing example aspects of the invention, as described above.

Included in the programming and/or software of the general and/or special purpose computer or microprocessor are software modules for implementing the procedures described above.

While various example embodiments of the invention have been described above, it should be understood that they have been presented by way of example, and not limitation. It is apparent to persons skilled in the relevant art(s) that various changes in form and detail can be made therein. Thus, the invention should not be limited by any of the above described example embodiments, but should be defined only in accordance with the following claims and their equivalents.

In addition, it should be understood that the figures are presented for example purposes only. The architecture of the example embodiments presented herein is sufficiently flexible and configurable, such that it may be utilized and navigated in ways other than that shown in the accompanying figures.

Further, the purpose of the Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the example embodiments presented herein in any way. It is also to be understood that the procedures recited in the claims need not be performed in the order presented.

We claim:

1. A system to communicate user service requests to service provider systems and to provide response data associated with user service requests via a wallet client of a mobile device, the system comprising:
   at least one storage device; and
   at least one processor communicatively coupled to the at least one storage device, wherein the at least one processor executes instructions that are stored in the at least one storage device to cause the system to:
   receive, in a wallet client database, service provider system information from a service provider system;
   receive, in the wallet client database, database entries that include, in association with the service provider system and an operating system, a base URL, an authentication procedure, and a URL signature; and
   receive, in a wallet client, an indication of a selection of a particular user service request;
   receive, in the wallet client, an indication of a selection of a particular user service request;
   authenticate the wallet client with the service provider system based on the service provider information, by validating the URL signature, creating an authentication request based on the base URL, adding parameters to the authentication request based on the authentication procedure, thereby generating an augmented authentication request, and transmitting the augmented authentication request to the service provider system;
   upon authentication, establish a communication session with the service provider system;
   transmit, to the service provider system, an invocation message including a wallet identifier and a request URL associated with the particular user service request;
   receive, from the service provider system, data in response to the request URL; and
   present, via a user interface, at least a portion of the data received from the service provider system.

2. The system of claim 1, wherein the service provider information includes at least one of: a service provider system name, a service provider system listing, a payment product name, customer care contact information, a uniform resource locator (URL) to a payment product registration webpage, a URL to a payment product activation service, a URL to a service provider system website, a URL to a service provider mobile application, a logo corresponding to payment product, payment product identifying digits, a payment product expiration date, a payment product current balance, a payment product amount of available credit, or an activation state of the payment product.

3. The system of claim 1, the at least one processor being further operable to establish the communication session by:
   generating a first nonce and a second nonce;
   transmitting a session establishment request to a wallet server, the session establishment request including at least one of: the first nonce and the second nonce, a cryptographic ticket scheme, a wallet identifier associated with the wallet client, or a mobile device identifier associated with the wallet client;
   generating a signing key based on the first nonce; generating an encryption key based on the second nonce
   signing at least one message using the signing key; and
   encrypting the at least one message using the encryption key.

4. The system of claim 3, the at least one processor being further operable to invoke the servicing environment by:
   retrieving the request URL from the service provider system information in the wallet client database;
   signing the request URL using the signing key and encrypting the request URL using the encryption key, thereby generating a signed encrypted request URL,
   wherein the request URL transmitted to the service provider system comprises the signed encrypted request URL.

5. The system of claim 4, wherein the request URL corresponds to at least one of a service provider system website, a service provider system web application, a service provider system mobile device, or a mobile device application store application, and wherein establishing a communication session further comprises launching the corresponding website or application on the system to communicate with the service provider system via the corresponding website or application.

6. The system of claim 4, wherein the at least one processor is further operable to launch, if the request URL corresponds to a service provider system mobile device application that is unavailable, a mobile device store application and downloads the service provider system mobile device application.

7. The system according to claim 1, the at least one processor is further operable to, after the invoking of the service environment, perform at least one of: adding a payment product to the wallet client, activating the payment product, presenting payment product details, upgrading the payment product, or adding funds to the payment product.

8. A method to communicate user service requests to service provider systems and to provide response data associated with user service requests via a wallet client of a mobile device, comprising:
   receiving, by a wallet client database and on a mobile device, service provider system information from a service provider system comprising instructions to generate request uniform resource locators (URLs) associated with one or more user service requests;
   receive database entries that include, in association with the service provider system and an operating system, a base URL, an authentication procedure, and a URL signature;
   receive, in a wallet client on the mobile device, an indication of a selection of a particular user service request; and,
   authenticate a wallet client with the service provider system based on the service provider information, by validating the URL signature, creating an authentication request based on the base URL, adding parameters to the authentication request based on the authentication procedure, thereby generating an augmented authentication request, and transmitting the augmented authentication request to the service provider system;
   upon authentication, establish a communication session with the service provider system;
   transmit, to the service provider system, an invocation message including a wallet identifier and a request URL associated with the particular user service request;
   receive, from the service provider system, data in response to the request URL; and present, via a user interface of the mobile device, at least a portion of the data received from the service provider system.

9. The method of claim 8, wherein the service provider system information includes at least one of: a service provider system name, a service provider system listing, a payment product name, customer care contact information, a request URL to a payment product registration webpage, a request URL to a payment product activation service, a request URL to a service provider website, a request URL to a service provider mobile application, a logo corresponding to payment product, payment product identifying digits, a payment product expiration date, a payment product current balance, a payment product amount of available credit, or an activation state of the payment product.

10. The method of claim 8, wherein the establishing of the communication session includes:
generating a first nonce and a second nonce;
transmitting a session establishment request to a wallet server, the session establishment request including at least one of: the first nonce and the second nonce, a cryptographic ticket scheme, a wallet identifier associated with the wallet client, or a mobile device identifier associated with the wallet client;
generating a signing key based on the first nonce; generating an encryption key based on the second nonce
signing at least one message using the signing key; and
encrypting the at least one message using the encryption key.

11. The method of claim 10, wherein the invoking of the servicing environment includes:
signing the request URL using the signing key and encrypting the request URL using the encryption key, thereby generating a signed encrypted URL,
wherein the request URL in the invocation message comprises the signed encrypted URL.

12. The method of claim 11, wherein the request URL corresponds to a service provider system website.

13. The method of claim 11, wherein, if the request URL corresponds to a service provider system mobile device application that is unavailable, the wallet client launches a mobile device store application and downloads the service provider system mobile device application.

14. The method according to claim 8, further comprising, after the invoking of the service environment, one or more of:
activating, by the service provider system, a payment product, wherein the request URL corresponds to a user service request to activate the payment product and wherein the response data received from the service provider system indicates that the payment product was successfully activated,
upgrading, by the service provider system, the payment product, wherein the base URL corresponds to a user service request to upgrade the payment product and wherein the response data received from the service provider system comprises an indication that the payment product was upgraded, and
adding, by the service provider system, funds to the payment product, wherein the base URL corresponds to a user service request to add the funds to the payment product and wherein the response data received from the service provider system comprises an indication that the funds were added to the payment product.

15. A non-transitory computer-readable medium having computer-executable program instructions embodied thereon that when executed by a computer cause the computer to communicate user service requests to service providers and to provide response data associated with user service requests via a wallet client of a mobile device, the computer-executable program instructions comprising:
computer-executable program instructions to receive service provider system information from a service provider system;
computer-executable program instructions to receive database entries that include, in association with the service provider system and an operating system, a base URL, an authentication procedure, and a URL signature;
computer-executable program instructions to receive, in a wallet client on a mobile device, an indication of a selection of a particular user service request;
computer-executable program instructions to receive, in a wallet client on the mobile device, an indication of a selection of a particular user service request to authenticate, based on the service provider system information,
computer-executable program instructions to authenticate the wallet client with a service provider system based on the service provider information, by validating the URL signature, creating an authentication request based on the base URL, adding parameters to the authentication request based on the authentication procedure, thereby generating an augmented authentication request, and transmitting the augmented authentication request to the service provider system;
upon authentication, computer-executable program instructions to establish a communication session with the service provider system;
computer-executable program instructions to transmit, to the service provider system, an invocation message including a wallet identifier and a request URL associated with the particular user service request;
computer-executable program instructions to receive, from the service provider system, data in response to the request URL; and
computer-executable program instructions to present, via a user interface of the mobile device, at least a portion of the data received from the service provider system.

16. The non-transitory computer-readable medium of claim 15, wherein the service provider system information includes at least one of: a service provider system name, a service provider system listing, a payment product name, customer care contact information, a uniform resource locator (URL) to a payment product registration webpage, a URL to a payment product activation service, a URL to a service provider system website, a URL to a service provider mobile application, a logo corresponding to payment product, payment product identifying digits, a payment product expiration date, a payment product current balance, a payment product amount of available credit, or an activation state of the payment product.

17. The non-transitory computer-readable medium of claim 15, wherein, when executed by the computer processor, the sequences of instructions further cause the computer processor to establish the communication session by:
generating a first nonce and a second nonce;
transmitting a session establishment request to a wallet server, the session establishment request including at least one of: the first nonce and the second nonce, a cryptographic ticket scheme, a wallet identifier associated with the wallet client, or a mobile device identifier associated with the wallet client;

generating a signing key based on the first nonce; generating an encryption key based on the second nonce
signing at least one message using the signing key; and
encrypting the at least one message using the encryption key.

18. The non-transitory computer-readable medium of claim 17, wherein, when executed by the computer processor, the sequences of instructions further cause the computer processor to invoke the servicing environment by:
retrieving a URL from the service provider system information in the wallet client database;
signing the URL using the signing key and encrypting the URL using the encryption key, thereby generating a signed encrypted URL; and
transmitting, to the service provider system, an invocation message including a wallet identifier and the signed encrypted URL.

19. The non-transitory computer-readable medium of claim 18, wherein the URL corresponds to at least one of a service provider system website, a service provider system web application, a service provider system mobile device application, or a mobile device store application.

20. The non-transitory computer-readable medium of claim 18, wherein, when executed by the computer processor, the sequences of instructions further cause the computer processor to launch, if the URL corresponds to a service provider system mobile device application that is unavailable, a mobile device store application and downloads the service provider system mobile device application.

21. The non-transitory computer-readable medium of claim 15, wherein, when executed by the computer processor, the sequences of instructions further cause the computer processor to, after the invoking of the service environment, perform at least one of: adding a payment product to the wallet client, activating the payment product, presenting payment product details, upgrading the payment product, or adding funds to the payment product.

* * * * *